(12) United States Patent
Li

(10) Patent No.: US 12,197,449 B2
(45) Date of Patent: Jan. 14, 2025

(54) AI-BASED RECOMMENDATION METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Tianhao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 17/699,421

(22) Filed: Mar. 21, 2022

(65) Prior Publication Data

US 2022/0215032 A1 Jul. 7, 2022

Related U.S. Application Data

(63) Continuation of application No. PCT/CN2020/126549, filed on Nov. 4, 2020.

(30) Foreign Application Priority Data

Feb. 13, 2020 (CN) .......................... 202010095076.2

(51) Int. Cl.
G06F 16/2457 (2019.01)
(52) U.S. Cl.
CPC .............................. G06F 16/24578 (2019.01)
(58) Field of Classification Search
CPC ................................................ G06F 16/24578
(Continued)

(56) References Cited

U.S. PATENT DOCUMENTS

2004/0210661 A1* 10/2004 Thompson ............. G06Q 30/02
 709/228
2018/0253780 A1* 9/2018 Wang ...................... H04L 51/02
(Continued)

FOREIGN PATENT DOCUMENTS

CN 110162700 A 8/2019
CN 110263257 A 9/2019
(Continued)

OTHER PUBLICATIONS

International Search Report for PCT/CN2020/126549 filed Feb. 7, 2021 [PCT/ISA/210].
(Continued)

*Primary Examiner* — Hosain T Alam
*Assistant Examiner* — Saba Ahmed
(74) *Attorney, Agent, or Firm* — Sughrue Mion, PLLC

(57) ABSTRACT

Embodiments of the present disclosure provide an artificial intelligence (AD-based recommendation method and apparatus, an electronic device, and a computer-readable storage medium. The method includes obtaining a plurality of pieces of candidate recommendation information corresponding to a to-be-recommended object and forming a fusion feature corresponding to each of the plurality of pieces of candidate recommendation information. Then, the method includes performing multi-level mapping processing on the fusion feature to obtain scores corresponding to a plurality of indicators of each of the plurality of pieces of candidate recommendation information. The method may also include performing multi-indicator aggregation processing on the scores to obtain comprehensive scores and sorting the plurality of pieces of candidate recommendation information in a descending order according to the comprehensive score. Then piece of candidate recommendation information ranked at the top is selected.

19 Claims, 13 Drawing Sheets

(58) Field of Classification Search
USPC .......................................................... 707/723
See application file for complete search history.

(56) References Cited

U.S. PATENT DOCUMENTS

| | | | |
|---|---|---|---|
| 2018/0329990 A1* | 11/2018 | Severn | G06V 10/764 |
| 2020/0160090 A1* | 5/2020 | Agrawal | G06T 5/70 |
| 2021/0110457 A1* | 4/2021 | Polanía | G06V 20/00 |
| 2021/0248651 A1* | 8/2021 | Chang | G06Q 30/0282 |
| 2022/0092672 A1* | 3/2022 | Zielnicki | G06Q 10/083 |
| 2022/0215931 A1* | 7/2022 | Krishna | H04L 9/0643 |

FOREIGN PATENT DOCUMENTS

| | | |
|---|---|---|
| CN | 110266745 A | 9/2019 |
| CN | 111291266 A | 6/2020 |

OTHER PUBLICATIONS

Written Opinion for PCT/CN2020/126549 filed Feb. 7, 2021 [PCT/ISA/237].

\* cited by examiner

AI-BASED RECOMMENDATION METHOD AND APPARATUS, ELECTRONIC DEVICE, AND STORAGE MEDIUM

CROSS-REFERENCE TO RELATED APPLICATION(S)

This application is a continuation of International Application No. PCT/CN2020/126549, filed on Nov. 4, 2020, which claims priority to Chinese Patent Application No. 202010095076.2, filed with the China National Intellectual Property Administration on Feb. 13, 2020, the disclosures of which are incorporated by reference in their entireties.

FIELD

The present disclosure relates to the field of artificial intelligence (AI) technologies, and in particular, to an AI-based recommendation method and apparatus, an electronic device, and a computer-readable storage medium.

BACKGROUND

AI is a theory, method, technology, and an application system in which a digital computer or a machine controlled by a digital computer is used to simulate, extend, and expand human intelligence, perceive an environment, acquire knowledge, and use the knowledge to obtain an optimal result.

With the development of information technologies and Internet industry, information overload has become a challenge for people to deal with information. The personalized recommendation system effectively alleviates this problem by understanding the intentions of the user more accurately. However, in related art, information that may be ranked high but that a user may not really like is is still recommended to the user using a click-through rate estimation by using a linear sorting model or a depth sorting model. Using such methods results in inaccurate recommendation of the information and causes unnecessary consumption of computing resources and communication resources of the recommendation system.

SUMMARY

Example embodiments of the present disclosure provide an artificial intelligence (AI)-based recommendation method and apparatus, an electronic device, and a computer-readable storage medium, which can implement accurate recommendation of information.

The technical solutions in the embodiments of the present disclosure are implemented as follows.

According to an aspect of an example embodiment of the present disclosure an AI-based recommendation method is provided, the method including: obtaining a plurality of pieces of candidate recommendation information corresponding to a to-be-recommended object; forming a fusion feature corresponding to each of the plurality of pieces of candidate recommendation information based on obtaining an object feature of the to-be-recommended object and a candidate recommendation information feature of each of the plurality of pieces of candidate recommendation information, and combining the object feature with the candidate recommendation information feature of each of the plurality of pieces of candidate recommendation information; performing multi-level mapping processing on the fusion feature corresponding to each of the plurality of pieces of candidate recommendation information, to obtain scores corresponding to a plurality of indicators of each of the plurality of pieces of candidate recommendation information; performing multi-indicator aggregation processing on the scores respectively corresponding to the plurality of indicators of each of the plurality of pieces of candidate recommendation information, to obtain a comprehensive score of each of the plurality of pieces of candidate recommendation information, and sorting the plurality of pieces of candidate recommendation information in a descending order according to the comprehensive score of each of the plurality of pieces of candidate recommendation information; and selecting at least one piece of candidate recommendation information ranked top in a result of the sorting the plurality of pieces of candidate recommendation information in descending order, and performing a recommendation operation corresponding to the to-be-recommended object based on the selected candidate recommendation information.

An aspect of an example embodiment of the present disclosure provides an AI-based recommendation apparatus, including: at least one memory configured to store program code; and at least one processor configured to read the program code and operate as instructed by the program code, the program code comprising: first obtaining code configured to cause the at least one processor to obtain a plurality of pieces of candidate recommendation information corresponding to a to-be-recommended object; first forming code configured to cause the at least one processor to obtain an object feature of the to-be-recommended object and a candidate recommendation information feature of neach piece of candidate recommendation information, and combine the object feature with the candidate recommendation information feature of each piece of candidate recommendation information, to form a fusion feature corresponding to each piece of candidate recommendation information; first processing code configured to cause the at least one processor to perform multi-level mapping processing on the fusion feature corresponding to each piece of candidate recommendation information, to obtain scores corresponding to a plurality of indicators of each piece of candidate recommendation information; first sorting code configured to cause the at least one processor to perform multi-indicator aggregation processing on the scores respectively corresponding to the plurality of indicators of each piece of candidate recommendation information, to obtain a comprehensive score of each piece of candidate recommendation information, and sort the plurality of pieces of candidate recommendation information in descending order according to the comprehensive score of each piece of candidate recommendation information; and first recommendation code configured to cause the at least one processor to select at least one piece of candidate recommendation information ranked top in a result of sorting in the descending order, and perform a recommendation operation corresponding to the to-be-recommended object based on the selected candidate recommendation information.

An aspect of an example embodiment of the present disclosure provides an AI-based recommendation model training method, including: preprocessing a log of a recommendation system, to construct a training sample set; constructing a candidate recommendation information prediction model based on a plurality of expert networks, weight generators in a one-to-one correspondence with a plurality of indicators, and predictors in a one-to-one correspondence with the plurality of indicators; and performing multi-indicator training on the candidate recommendation information prediction model by using the training sample set, the candidate recommendation information prediction model obtained through training being used for the recommendation system to perform multi-indicator aggregation processing and sorting, to determine to-be-recommended candidate recommendation information according to a sorting result.

DETAILED DESCRIPTION

Figure 1A:
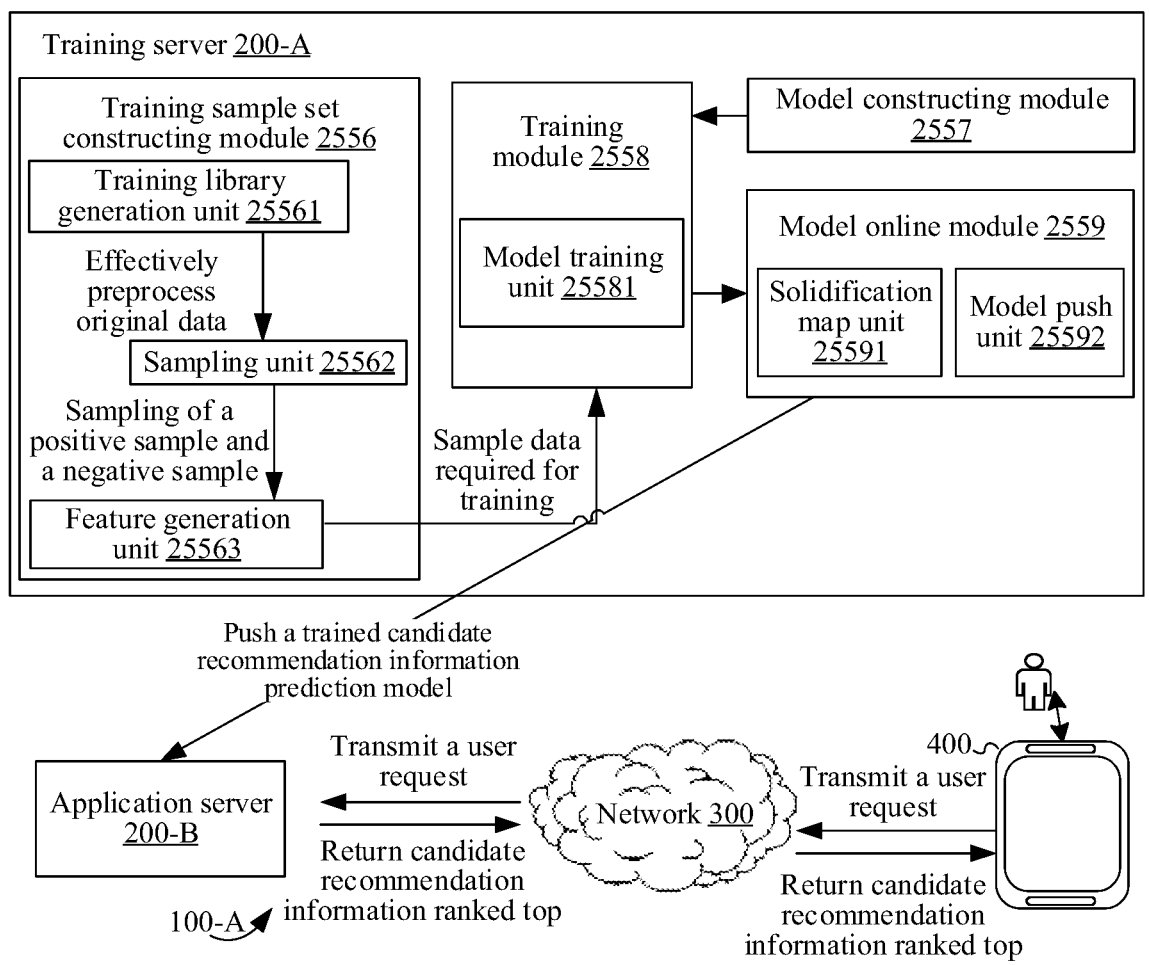
FIG. 1A is a schematic architectural diagram of an AI (Artificial Intelligence)-based recommendation system according to an embodiment of the present disclosure.

The following detailed description describes the present disclosure in further detail with reference to the accompanying drawings to clarify the advantages and technical solutions of the present disclosure. The described embodiments are not to be considered or intended as a limitation to the present disclosure. All other embodiments obtained by a person of ordinary skill in the art without creative efforts shall fall within the protection scope of the present disclosure.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

Before the embodiments of this application are further described in detail, nouns and terms involved in the embodiments of this application are described. The nouns and terms provided in the embodiments of this application are applicable to the following explanations.

(1) Multi-task learning (MTL) is to obtain a more accurate learner for each learning task by using useful information included in a plurality of learning tasks.

(2) An area under the receiver operating characteristic curve (AUC) is used as an evaluation standard of a model, which is obtained by summing an area of each part under the receiver operating characteristic curve.

(3) To-be-recommended object is a target on which information recommendation is performed. Because a medium for information presentation is a terminal, and the target on which information recommendation is performed is a user who operates a corresponding terminal, "object" and "user" are equivalently described below. It may be understood that the user herein may be a natural person who can operate the terminal, or a robot program that can simulate human behavior and run on the terminal.

(4) Candidate recommendation information is information that can be transmitted to a terminal for presentation to make recommendations to a user of a corresponding terminal.

(5) Expert network: each expert network is a forward propagation network, and an output of the expert network is a feature, which corresponds to a different task. A weight generation structure is introduced for each task, to output a weight value of the expert network, so that the output of the expert network is used by different comprehensive tasks in different manners.

There exist are some problems in a personalized sorting stage of a recommendation system in the real world, which mainly exist because there are many different or even conflicting optimization objectives. For example, users are expected not only to view, but also to give high ratings and share. There are often some implicit biases in the recommendation system. For example, the user clicks/taps information content because the information content is ranked at the top, rather than actually liking the information content. Therefore, because the data generated by an inaccurate model triggers model training bias, and a feedback loop is formed, making the bias more and more severe. To effectively resolve this and other problems, the embodiments of the present disclosure provide an AI-based recommendation method, a candidate recommendation information prediction model of a personalized recommendation system is deeply optimized and improved by respectively designing a plurality of layers of expert networks, introducing a multi-indicator uncertainty factor, resolving classification imbalances, and improving a model activation function, so that indicators such as an AUC and a root-mean-square error evaluated offline by the model improve significantly. In addition, a configurable design for sorting target(s) of an online recommendation system make the sorting result/ recommendation more flexible and controllable, and can finally positive drive core indicators recommended online. Another advantage is that explicit user interaction is increased and users are more engaged.

According to an AI-based recommendation method and apparatus, an electronic device, and a computer-readable storage medium provided in the embodiments of the present disclosure, the core indicators of online recommendation systems can be positively driven, and the proportion of explicit user interaction behavior is increased significantly. The following describes an exemplary application of the electronic device provided in the embodiments of the present disclosure. The electronic device provided in the embodiments of the present disclosure may be implemented as various types of user terminals such as a notebook computer, a tablet computer, a desktop computer, a set-top box, a mobile device (for example, a mobile phone, a portable music player, a personal digital assistant, a dedicated message device, or a portable game device), or an on-board computer, or may be implemented as a server. An exemplary application is described below when a device is implemented as a server.

FIG. 1A is an exemplary schematic architectural diagram of an AI-based recommendation system 100-A according to an embodiment of the present disclosure. A terminal 400 is connected to an application server 200-B and a training server 200-A through a network 300. The network 300 may be a wide area network or a local area network, or a combination of thereof. The training server 200-A is responsible for offline training of a candidate recommendation information prediction model. The training server 200-A includes a training sample set constructing module 2556, a model constructing module 2557, a training module 2558, and a model online module 2559. The training sample set constructing module 2556 includes a training library generation unit 25561, a sampling unit 25562, and a feature generation unit 25563. The training module 2558 includes a model training unit 25581. The model online module 2559 includes a solidification map unit 25591 and a model push unit 25592. The training library generation unit 25561 is configured to effectively preprocess original data, the sampling unit 25562 is configured to sample positive samples and negative samples of the effectively preprocessed original data, and the feature generation unit 25563 is configured to further perform feature extraction on sample information, to obtain sample data required for training. The model training unit 25581 in the training module 2558 is configured to train, based on the obtained sample data, the candidate recommendation information prediction model generated by the model constructing module 2557, and the trained candidate recommendation information prediction model is launched to the recommendation system in the application server 200-B by using the solidification map unit 25591 and the model push unit 25592 in the model online module 2559. In response to a user request from the terminal 400 received by the application server 200-B, the trained candidate recommendation information prediction model outputs candidate recommendation information ranked top, and returns the candidate recommendation information ranked top to the terminal 400.

In some embodiments, the training server 200-A may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform. The terminal 400 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of the present disclosure.

Figure 2A:
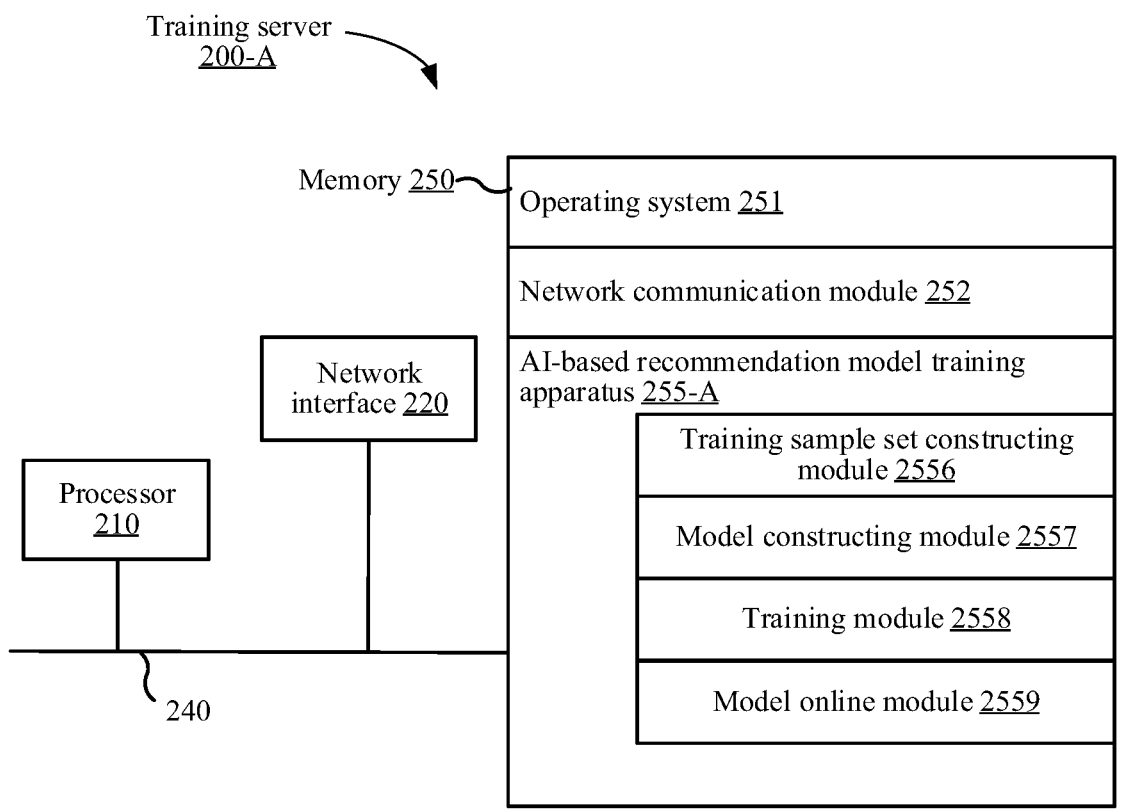
FIG. 2A is a schematic structural diagram of a training server to which an AI-based recommendation model training method is applied according to an embodiment of the present disclosure.

FIG. 2A is a schematic structural diagram of a training server 200-A to which an AI-based recommendation model training method is applied according to an embodiment of the present disclosure. The training server 200-A shown in FIG. 2A includes at least one processor 210, a memory 250, and at least one network interface 220. All the components in the terminal 200 are coupled together by a bus system 240. It may be understood that the bus system 240 is configured to implement connection and communication between the components. In addition to a data bus, the bus system 240 further includes a power bus, a control bus, and a state signal bus. However, for clear description, various buses are all labeled as the bus system 240 in FIG. 2A.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 250 may be a removable memory, a non-removable memory, or a combination thereof. Exemplary hardware devices include a solid-state memory, a hard disk drive, an optical disc driver, or the like. The memory 250 may also include one or more storage devices physically away from the processor 210.

The memory 250 includes a volatile memory or a non-volatile memory, or may include both a volatile memory and a non-volatile memory. The non-volatile memory may be a read-only memory (ROM), and the volatile memory may be a random access memory (RAM). The memory 250 described in the embodiments of the present disclosure is to include any other suitable type of memories.

In some embodiments, the memory 250 may store data to support various operations. Examples of the data include programs, modules, and data structures, or a subset or a superset thereof. The descriptions are made below by using examples.

An operating system 251 includes a system program configured to process various basic system services and perform a hardware-related task, for example, a framework layer, a core library layer, and a driver layer, and is configured to implement various basic services and process a hardware-related task.

A network communication module 252 is configured to reach another computing device through one or more (wired or wireless) network interfaces 220. Exemplary network interfaces 220 include: Bluetooth, wireless compatible authentication (Wi-Fi), a universal serial bus (USB), and the like.

In some embodiments, an AI-based recommendation model training apparatus provided in the embodiments of this application may be implemented by using software. FIG. 2A shows an AI-based recommendation model training apparatus 255-A stored in the memory 250. The AI-based recommendation model training apparatus may be software in a form such as a program and a plug-in, and includes the following software modules: a training sample set constructing module 2556, a model constructing module 2557, a training module 2558, and a model online module 2559.

These modules are logical modules, and may be randomly combined or further divided based on a function to be performed. The following describes functions of the modules.

In some embodiments, the AI-based recommendation model training apparatus provided in the present disclosure may be implemented by using hardware. For example, the AI-based recommendation model training apparatus provided in this embodiment of the present disclosure may be a processor in a form of a hardware decoding processor, programmed to perform the AI-based recommendation model training method provided in the embodiments of the present disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

The AI-based recommendation model training method provided in the embodiments of the present disclosure are described with reference to an exemplary application and implementation of the server.

An AI-based recommendation method and an AI-based recommendation model training method provided in the embodiments of the present disclosure respectively in two stages. The first stage is an offline training stage of a candidate recommendation information prediction model.

Figure 3:
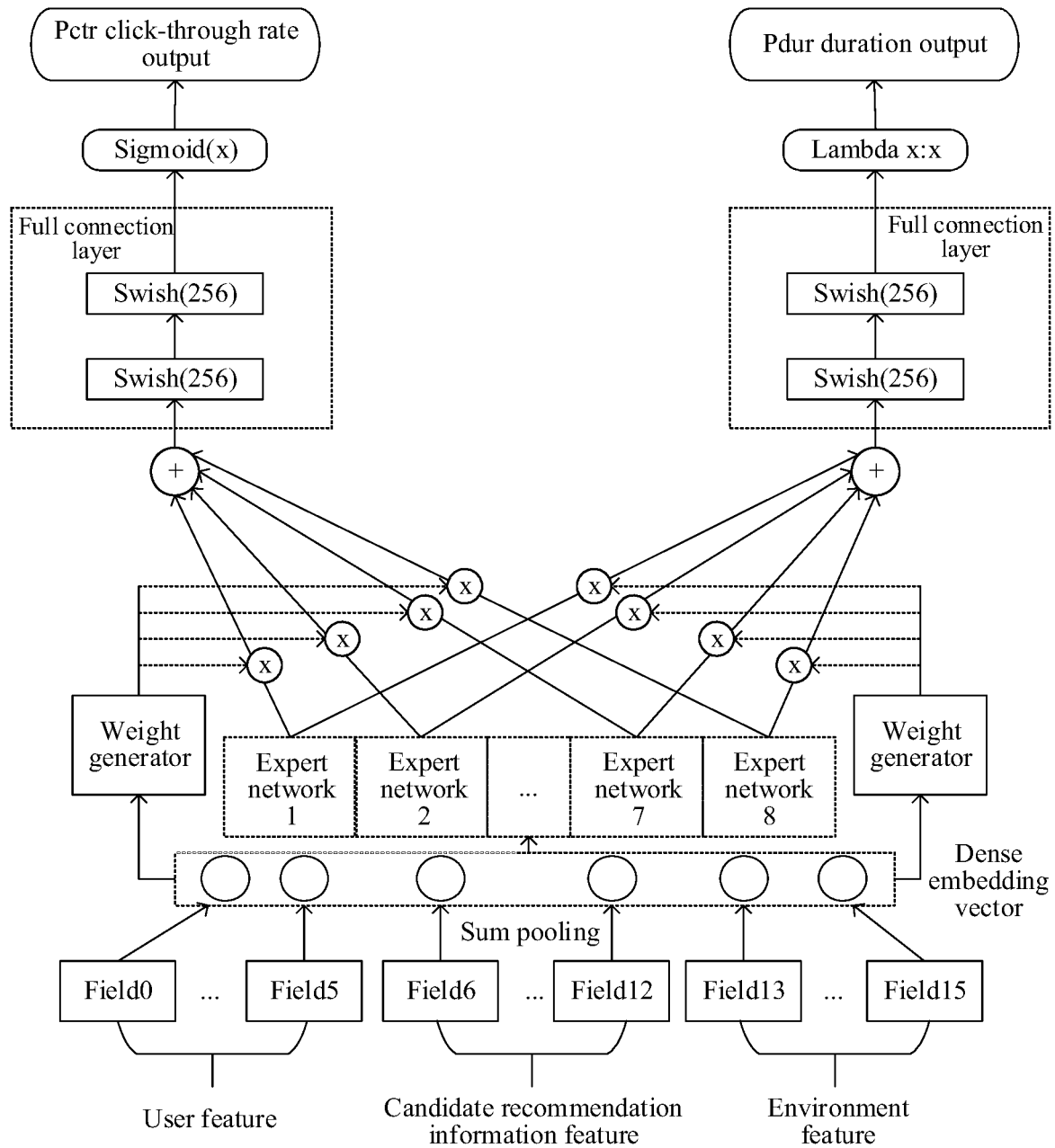
FIG. 3 is a model architecture diagram of an AI-based recommendation model training method according to an embodiment of the present disclosure.

FIG. 3 is a model architecture diagram of an AI-based recommendation model training method according to an embodiment of the present disclosure.

The model herein is a candidate recommendation information prediction model. User features (indicated by Field0 to Field5 in FIG. 3) in the form of discrete vectors, candidate recommendation information features (indicated by Field6 to Field12 in FIG. 3) in the form of discrete vectors, and environment features (indicated by Field13 to Field15 in FIG. 3) in the form of discrete vectors are converted into a form of dense embedding vectors. The user features, the candidate recommendation information features, and the environment features that are in the form of dense embedding vectors are input into a sum pooling layer. All pixel values of feature maps of channels are summed, so that each channel obtains a real number value, N channels finally obtains a vector of a length of N, and the vector is a result of sum pooling. The pooling result is inputted into a plurality of layers of expert networks (including expert networks 1 to 8) and weight generators corresponding to indicators shown in FIG. 3. The weight generator processes the result of sum pooling based on the following formula (1), to obtain a weight distribution of an expert network for a corresponding indicator:

$$g^k(x) = \text{softmax}(W_{gk}x) \quad (1)$$

where $g^k(x)$ is a weight of a feature outputted by each expert network corresponding to a kth indicator, $W_{gk}$ is a weight parameter of a weight generator corresponding to the $k^{th}$ indicator, x is a result obtained after sum pooling is performed on all inputted features. An indicator corresponding to the weight generator on the left side of FIG. 3 is an indicator 1, and the indicator 1 herein may be a click-through rate. An indicator corresponding to the weight generator on the right side of FIG. 3 is an indicator 2, and the indicator 2 herein may be a duration. The weight generator on the left side is used as example, which may generate 8 weights respectively assigned to the expert networks 1 to 8. Each expert network outputs a sub-feature, which is multiplied by a corresponding weight and then summed to obtain a feature used to predict the indicator 1. For a detailed process, reference may be made to formula (2):

$$f^k(x) = \sum_{i=1}^{n} g^k(x)_i f_i(x) \quad (2)$$

where $f^k$ is an output of the plurality of layers of expert networks corresponding to the $k^{th}$ indicator, $g^k(x)_i$ is a weight of a feature outputted by an $i^{th}$ expert network corresponding to the $k^{th}$ indicator, and $f_i(x)$ is the feature outputted by the $i^{th}$ expert network.

Features obtained by performing weighted summation on the features outputted by the expert networks are inputted into a full connection layer. The full connection layer is formed by a new activation function (Swish (256)). An original formula of the new activation function is shown in formula (3), and a deformation formula is shown in formula (4):

$$f(x) = x * \text{sigmoid}(x) \quad (3)$$

$$f(x) = x * \text{sigmoid}(\beta * x) \quad (4)$$

Figure 4:
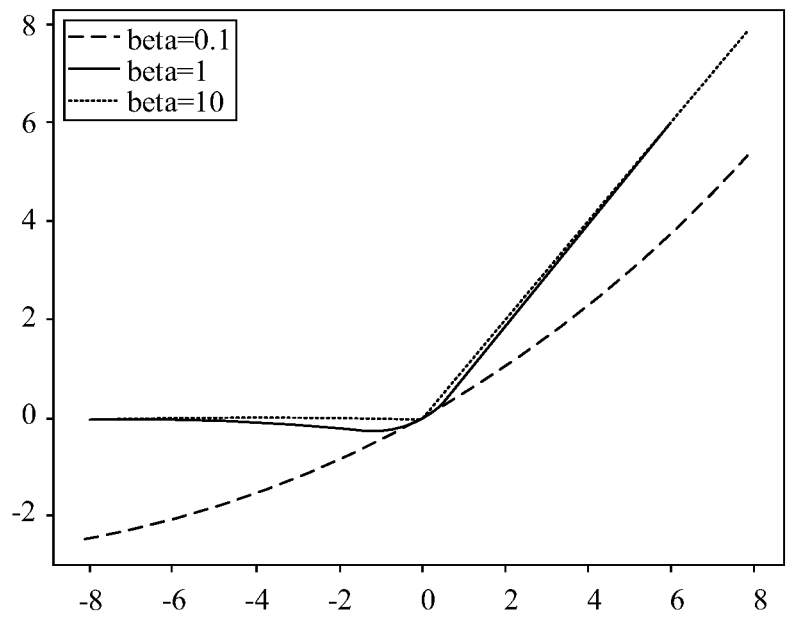
FIG. 4 is a schematic diagram of a new activation function according to an embodiment of the present disclosure.

The following describes the Swish activation function provided in this embodiment of the present disclosure. FIG. 4 is a schematic diagram of a new activation function according to an embodiment of the present disclosure. The Swish (256) activation function herein is unsaturated, smooth, and non-monotonic. When β (beta) is 1, the activation function has no upper bound and lower bound and is smooth and non-monotonic, which alleviates a phenomenon of gradient disappearance during training. When β is 0.1, the activation function has no upper bound and lower bound and is smooth. When β is 10, the activation function has no upper bound and lower bound and is non-monotonic.

Still referring to FIG. 3, features outputted by the full connection layer are outputted by using a Sigmoid activation function, to obtain a prediction score (a click-through rate output in FIG. 3) corresponding to the indicator 1. For the indicator 2, the features outputted by the full connection layer are inputted into an expression "lambda x: x", and an input value is returned to be an output value, to obtain a prediction score (a duration output Pdur in FIG. 3) corresponding to the indicator 2. A process of finally obtaining scores corresponding to the indicators based on the features inputted into the full connection layer may be implemented by using a formula (5):

$$y_k = h^k(f^k(x)) \quad (5)$$

where $f^k$ is an output of the plurality of layers of expert networks corresponding to the $k^{th}$ indicator, and $h^k$ is a tower network corresponding to the $k^{th}$ indicator, the tower network being the full connection layer shown in FIG. 3.

Figure 5A:
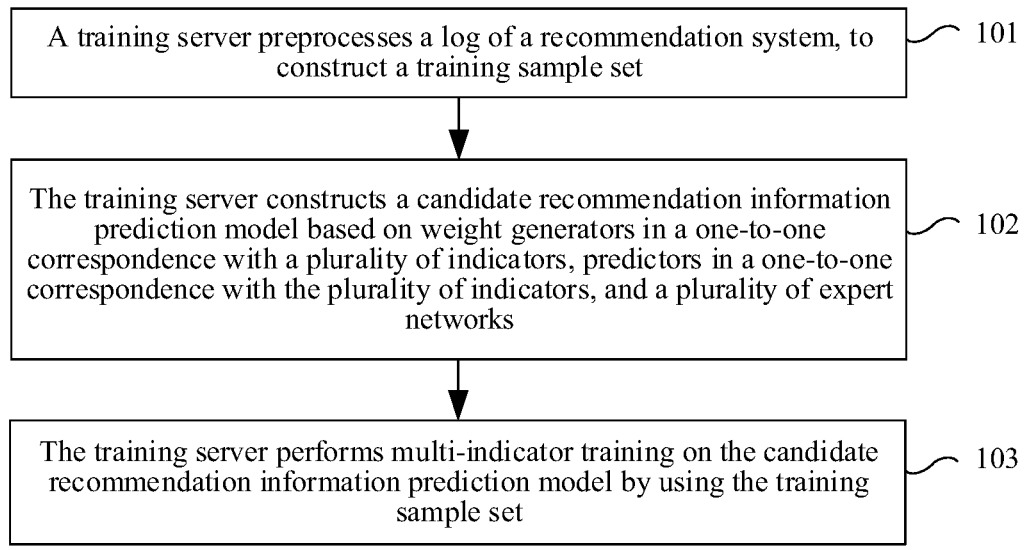
FIGS. 5A-5C are schematic flowcharts of an AI-based recommendation model training method according to an embodiment of the present disclosure.

FIG. 5A is an exemplary schematic flowchart of an AI-based recommendation model training method according to an embodiment of the present disclosure. A description is made with reference to operations 101 to 103 shown in FIG. 5A.

Operation 101: A training server preprocesses a log of a recommendation system, to construct a training sample set.

The training server herein is a server configured to train the foregoing candidate recommendation information prediction model. The log herein includes user behavior data in a recommendation system. The user behavior data is data related to user behavior events. There are three factors of the user behavior events: an operation, which defines an operation action (such as clicking/tapping or dragging); a parameter/an attribute, where the parameter may be any attribute related to this event, including a person, a time, a place, a device, and service information of the operation that trigger this event; and an attribute value, that is, a value of the parameter/attribute. The training sample set is obtained by preprocessing original data in the log.

Figure 5B:
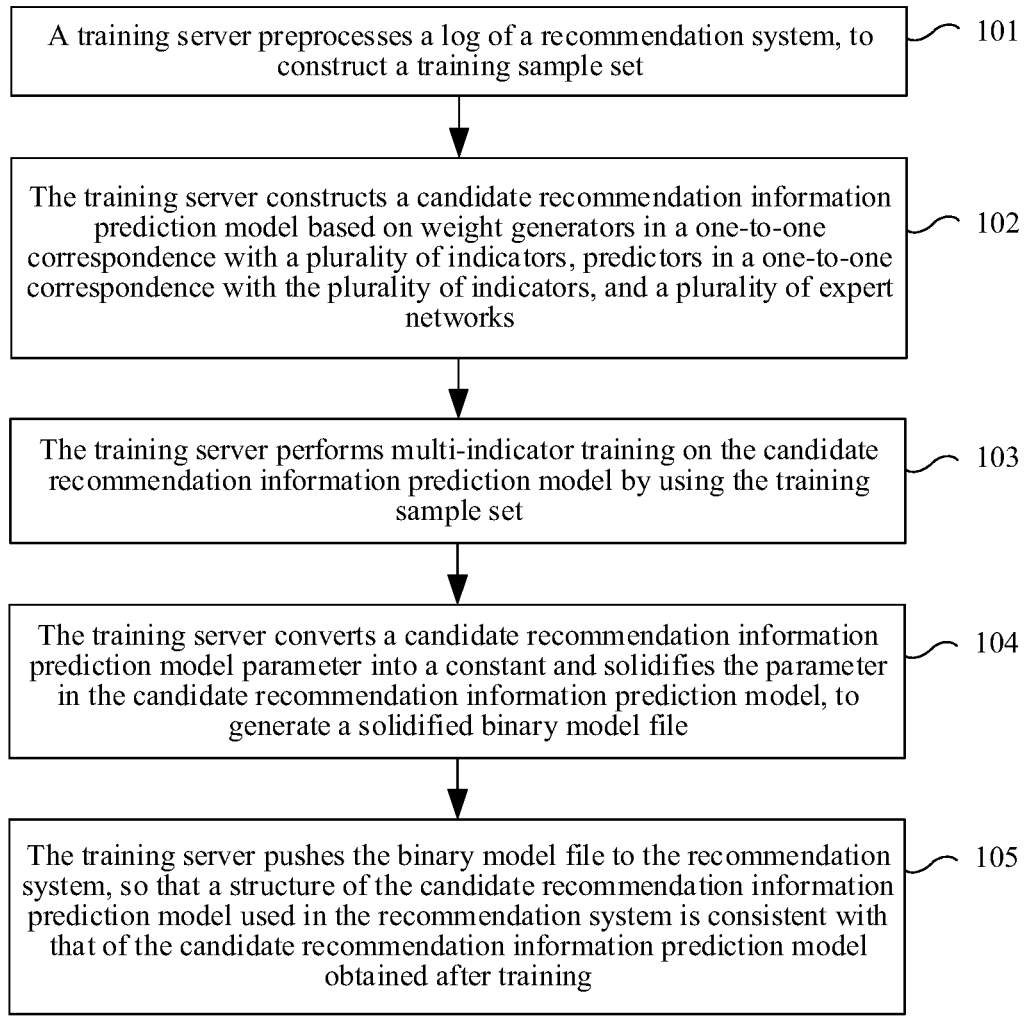
Figure 5C:
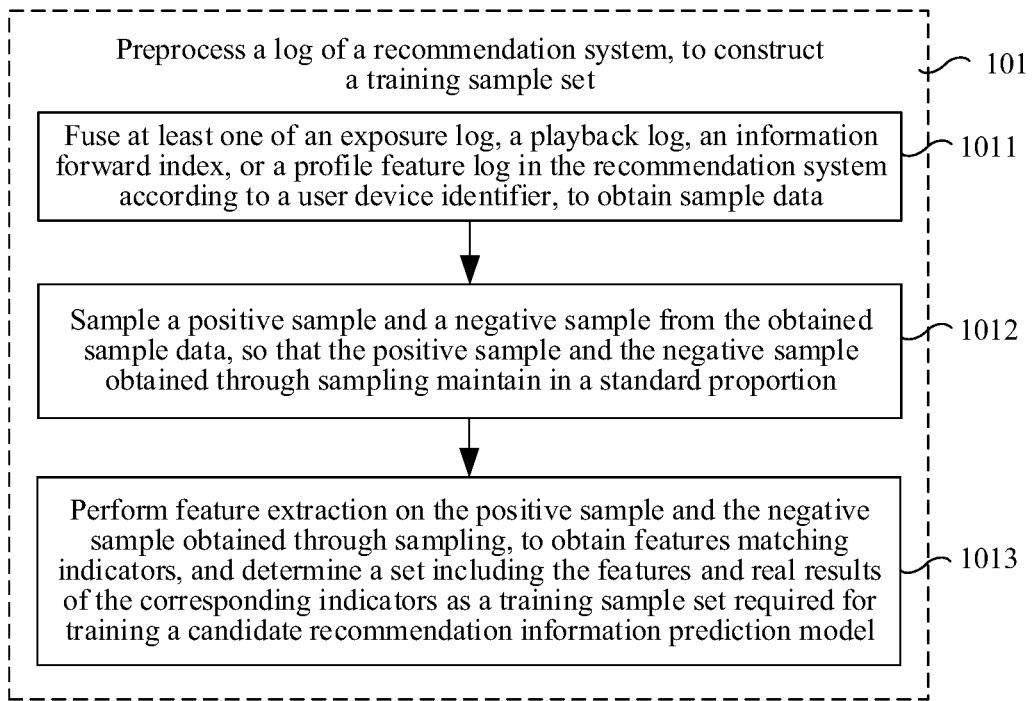

Based on FIG. 5A, FIG. 5C is an exemplary schematic flowchart of an AI-based recommendation model training method according to an embodiment of the present disclosure. In operation 101, preprocessing a log of a recommendation system, to construct a training sample set may be implemented in operations 1011 to 1013.

Operation 1011: Fuse at least one of an exposure log, a playback log, an information forward index, or a profile feature log in the recommendation system according to an object device identifier, to obtain sample data.

In some embodiments, extraction and analysis are first performed on data such as exposure, a click/tap, conversion, and a stay time in an event tracking log, for example, various operations are associated based on an exposure serial number, an event tracking parameter (for example, a real-time feature recorded in the log) is analyzed, and a context feature is analyzed, sample data obtained is then filtered, for example, a malicious user sample is filtered and an invalid exposure sample is filtered. For example, when the same candidate recommendation information is exposed to the same user a plurality of times at different times, there are cases in which the same user clicks/taps and does not click/tap on the same candidate recommendation information in a training sample set. If an interval between a plurality of times of exposure is quite short, only data of one time of exposure is considered, or, to avoid the influence of a user with a high activity level on a loss function, the same quantity of original data is extracted from each user in the log.

Operation 1012: Sample a positive sample and a negative sample from the obtained sample data, so that the positive sample and the negative sample obtained through sampling maintain in a standard proportion.

In some embodiments, feature extraction is performed on the filtered sample data, to generate a sample with a feature. Feature engineering is mainly performed from two dimensions of user and candidate recommendation information, and feature engineering may also be performed from three dimensions of user, candidate recommendation information, and environment information, the positive sample and the negative samples are then sampled according to a specific proportion of the positive sample to the negative sample, so that the positive sample and the negative sample obtained through sampling maintain in a standard proportion. The standard proportion is a set proportion, which may be determined according to a priori data of the recommendation system.

The positive sample and the negative sample herein are for indicators. The indicators may be a click-through rate and a duration. For a click-through rate task, the positive sample may be various sample data corresponding to a predicted click-through rate, and a sample label in the sample data is a high click-through rate (the high click-through rate herein is a relative concept, and a click-through rate preset higher than a click-through rate threshold may be used as a high click-through rate). The negative sample may be various sample data corresponding to a predicted click-through rate, and a sample label in the sample data is a low click-through rate (the low click-through rate herein is a relative concept, and a click-through rate preset lower than a click-through rate threshold may be used as a low click-through rate). The quantity of negative samples may be large, and it is not appropriate to directly train the negative samples, so that the proportion of the positive samples to negative samples needs to be ensured before training.

The original data may have the following problems: The quantity of samples is excessively small, the amount of data is too small to represent an entire sample, and the quantity of samples needs to represent entire data as much as possible. Sampling deviation occurs, the quantity of samples needs to be ensured, as well as the quality. If there is data that does not meet the requirements of a model, some algorithms are very sensitive to the balance of data and have high requirements on feature distribution or feature segmentation. For such a model, if the proportion of the positive samples to the negative samples is ignored, the model performance reduces significantly. As another example, if there is data that does not meet service requirements, in a specific service scenario, or there are few positive samples, or a parameter trained in for the model in this example has a limited expression capability, the model may not meet requirements on a recall rate of a service. A method for resolving a problem of unbalanced samples is performing sampling, including sampling to obtain the positive samples and sampling to obtain the negative samples, so that finally, the positive samples and the negative samples obtained through sampling maintain in a set proportion. Through the foregoing implementations, the problem of unbalanced samples is resolved, so that the model meets the requirements on the recall rate of the service, and the recommendation performance of the recommendation system is significantly improved, effectively improving the utilization efficiency of communication resources and computing resources of the recommendation system.

Operation 1013: Perform feature extraction on the positive sample and the negative sample obtained through sampling, to obtain features matching the indicators, and determine a set including the features and real results of the corresponding indicators as a training sample set required for training a candidate recommendation information prediction model.

In some embodiments, the positive sample is used as an example. Feature extraction is performed on the positive sample, to obtain at least one feature corresponding to the positive sample and a real result (label) of an indicator corresponding to the positive sample. For example, when the indicator is a click-through rate, the real result herein may be a high click-through rate, and the feature and the real result of the corresponding indicator are used as a training sample.

Operation 102: The training server constructs a candidate recommendation information prediction model based on weight generators in a one-to-one correspondence with a plurality of indicators, predictors in a one-to-one correspondence with the plurality of indicators, and a plurality of expert networks Referring to FIG. 3, the candidate recommendation information prediction model includes a feature input part, and features are differentiated according to fields, including user features, candidate recommendation information features, and environment features. The user features are differentiated by field according to different types of features. The features are inputted into a sum pooling layer, and then are inputted from the sum pooling layer to a plurality of expert networks (the expert networks 1 to 8). The candidate recommendation information prediction model further includes two weight generators. The weight generator on the left side of FIG. 3 corresponds to an indicator 1, and the weight generator on the right side of FIG. 3 corresponds to an indicator 2. The candidate recommendation information prediction model further includes two tower networks, each tower network includes a predictor formed by a full connection layer and an activation function, and the predictors respectively correspond to different indicators (the indicator 1 and the indicator 2).

Operation 103: The training server performs multi-indicator training on the candidate recommendation information prediction model by using the training sample set, the candidate recommendation information prediction model obtained through training being used for the recommendation system to perform multi-indicator aggregation processing and sorting, to determine to-be-recommended candidate recommendation information according to a sorting result.

In some embodiments, the performing multi-indicator training on the candidate recommendation information prediction model by using the training sample set in operation 103 may be implemented by the following technical solution: initializing the candidate recommendation information prediction model, and initializing loss functions corresponding to the plurality of indicators, the loss function including a feature sample and a score corresponding to the feature sample; performing the following processing in each iterative training process of the candidate recommendation information prediction model: scoring the feature sample included in the training sample set by using the candidate recommendation information prediction model, to obtain a score corresponding to the feature sample for each indicator; substituting a real result and the score corresponding to the feature sample into the loss function, to determine a corresponding candidate recommendation information prediction model parameter when a minimum value of the loss function is obtained; and updating the candidate recommendation information prediction model according to the determined candidate recommendation information prediction model parameter.

In some embodiments, the operation of scoring the feature sample included in the training sample set by using the candidate recommendation information prediction model, to obtain a score corresponding to the feature sample for each indicator may be implemented by the following technical solution: respectively mapping the feature samples to feature spaces corresponding to the expert networks by using the plurality of expert networks in the candidate recommendation information prediction model, to obtain sub-features of feature dimensions associated with the expert networks; weighting the obtained sub-features associated with the expert networks based on weights of the obtained sub-features corresponding to the expert networks in the sub-feature weight distribution, to respectively obtain indicator features corresponding to the feature samples; and performing score prediction processing on the feature samples with reference to the indicator features by using the predictors included in the candidate recommendation information prediction model that correspond to the indicators, to obtain scores of the feature samples based on the indicators.

In some embodiments, the feature samples include a user feature, a candidate recommendation information feature, and an environment feature.

The feature samples are inputted into a plurality of layers of expert networks and the weight generators corresponding to the indicators. The weight generator processes the result of sum pooling based on the formula (1), to obtain a weight distribution of an expert network for a corresponding indicator.

An indicator corresponding to the weight generator on the left side of FIG. 3 is an indicator 1, and the indicator 1 may be a click-through rate. An indicator corresponding to the weight generator on the right side of FIG. 3 is an indicator 2, and the indicator 2 may be a duration. The weight generator on the left side of FIG. 3 is used as example, which may generate 8 weights respectively assigned to the expert networks 1 to 8.

Each expert network outputs a sub-feature, which is multiplied by a corresponding weight and then summed to obtain an indicator feature used to predict the indicator 1. For a detailed process, reference may be made to formula (2). The indicator features obtained by performing weighted summation on the features outputted by the expert networks are inputted into a full connection layer of the predictor (the tower network). The full connection layer is formed by a new activation function (Swish (256)). An original formula of the new activation function is shown in formula (3), and a deformation formula is shown in formula (4).

In some embodiments, the operation of substituting a real result and the score corresponding to the feature sample into the loss function, to determine a corresponding candidate recommendation information prediction model parameter when a minimum value of the loss function is obtained may be implemented by the following technical solution: respectively substituting the real results and the scores corresponding to the feature samples for the indicators into the loss functions corresponding to the indicators; performing weighted summation on the loss functions with reference to loss weights corresponding to the loss functions, to obtain an aggregate loss function corresponding to the candidate recommendation information prediction model; and minimizing the aggregate loss function, to obtain a corresponding candidate recommendation information prediction model parameter when a minimum value of the aggregate loss function is obtained, the candidate recommendation information prediction model parameter including a structure parameter corresponding to the candidate recommendation information model and a loss weight corresponding to the aggregate loss function.

In some embodiments, the aggregate loss function is:

$$L(W, \sigma_1^1, \sigma_2^1, \ldots, \sigma_n^1, \sigma_1^2, \sigma_2^2, \ldots, \sigma_n^2) = \sum \frac{1}{2(\sigma_i^1)^2} L_i^1(W) + \tag{6}$$

$$\log \sigma_1^1 \sigma_2^1 \ldots \sigma_n^1 + \sum \frac{1}{(\sigma_i^2)^2} L_i^2(W) + \log \sigma_1^2 \sigma_2^2 \ldots \sigma_n^2$$

where $L_i^1(W)$ is an $i^{th}$ loss function corresponding to an $i^{th}$ indicator in continuous indicators, $L_i^2(W)$ is an $i^{th}$ loss function corresponding to an $i^{th}$ indicator in discrete indicators, $$\frac{1}{2(\sigma_i^1)^2}$$

is a weight of the $i^{th}$ loss function corresponding to the $i^{th}$ indicator in the continuous indicators, $\sigma_i^1$ is used for representing uncertainty of score prediction on the $i^{th}$ indicator in the continuous indicators, $$\frac{1}{(\sigma_i^2)^2}$$

is a weight of the $i^{th}$ loss function corresponding to the $i^{th}$ indicator in the discrete indicators, $\sigma_i^2$ is used for representing uncertainty of score prediction on the $i^{th}$ indicator in the discrete indicators, and W is a structure weight corresponding to each indicator in the candidate recommendation information prediction model. An expression of the $i^{th}$ loss function corresponding to the discrete indicator is:

$$L_i^2(W) = -\alpha_t(1-P_t)^\gamma \log(P_t) \quad (7)$$

where $\alpha_t$ is a balance factor constant used for balancing positive samples and negative samples, $\gamma$ is an adjustment constant used for adjusting a weight reduction rate of a simple sample, and $P_t$ is a probability value corresponding to a score.

In some embodiments, due to different output, the weight of the loss function corresponding to each indicator is also different. When an output of a first indicator is a discrete output, and an output of a second indicator is also a discrete output, the aggregate loss function is:

$$L(W, \sigma_1, \sigma_2) = \frac{1}{\sigma_1^2}L_1(W) + \frac{1}{\sigma_2^2}L_2(W) + \log\sigma_1 + \log\sigma_2 \quad (8)$$

where $L_1(W)$ is a first loss function corresponding to the first indicator, $L_2(W)$ is a second loss function corresponding to the second indicator, $$\frac{1}{\sigma_1^2}$$

is a weight corresponding to the first loss function, $\sigma_1$ is used for representing uncertainty of score prediction on the first indicator, $$\frac{1}{\sigma_2^2}$$

is a weight corresponding to the second loss function, and $\sigma_2$ is used for representing uncertainty of score prediction on the second indicator.

In some embodiments, when the output of the first indicator is a continuous output, and the output of the second indicator is the discrete output, the aggregate loss function is:

$$L(W, \sigma_1, \sigma_2) = \frac{1}{2\sigma_1^2}L_1(W) + \frac{1}{\sigma_2^2}L_2(W) + \log\sigma_1 + \log\sigma_2 \quad (9)$$

where $L_1(W)$ is a first loss function corresponding to the first indicator, $L_2(W)$ is a second loss function corresponding to the second indicator, $$\frac{1}{2\sigma_1^2}$$

is a weight corresponding to the first loss function, $\sigma_1$ is used for representing uncertainty of score prediction on the first indicator, $$\frac{1}{\sigma_2^2}$$

is a weight corresponding to the second loss function, and $\sigma_2$ is used for representing uncertainty of score prediction on the second indicator.

In some embodiments, after operation 103 is performed, operations 104 and 105 may further be performed. FIG. 5B is an exemplary schematic flowchart of an AI-based recommendation model training method according to an embodiment of the present disclosure.

Operation 104: The training server converts a candidate recommendation information prediction model parameter into a constant and solidifies the parameter in the candidate recommendation information prediction model, to generate a solidified binary model file.

Operation 105: The training server pushes the binary model file to the recommendation system, so that a structure of the candidate recommendation information prediction model used in the recommendation system is consistent with that of the candidate recommendation information prediction model obtained after training.

In some embodiments, by fusing model training parameter data with a network structure, and by converting the model parameter into the constant, the parameter is solidified in a model network structure, to ensure the consistency of a network structure of an offline training model and a network structure of an online prediction model. An online recommendation system can simultaneously obtain the network structure and the model training parameter by loading the solidified model file, ensuring consistency. The finally obtained binary model file is pushed to the online recommendation system on a daily or hourly basis at a preset frequency through a timing task. Meanwhile, file content is generated as an information digest algorithm for encoding for subsequent model verification, and an entire offline training process is completed.

The second stage is an application stage of the candidate recommendation information prediction model, which is applied to the application server 200-B.

Figure 1B:
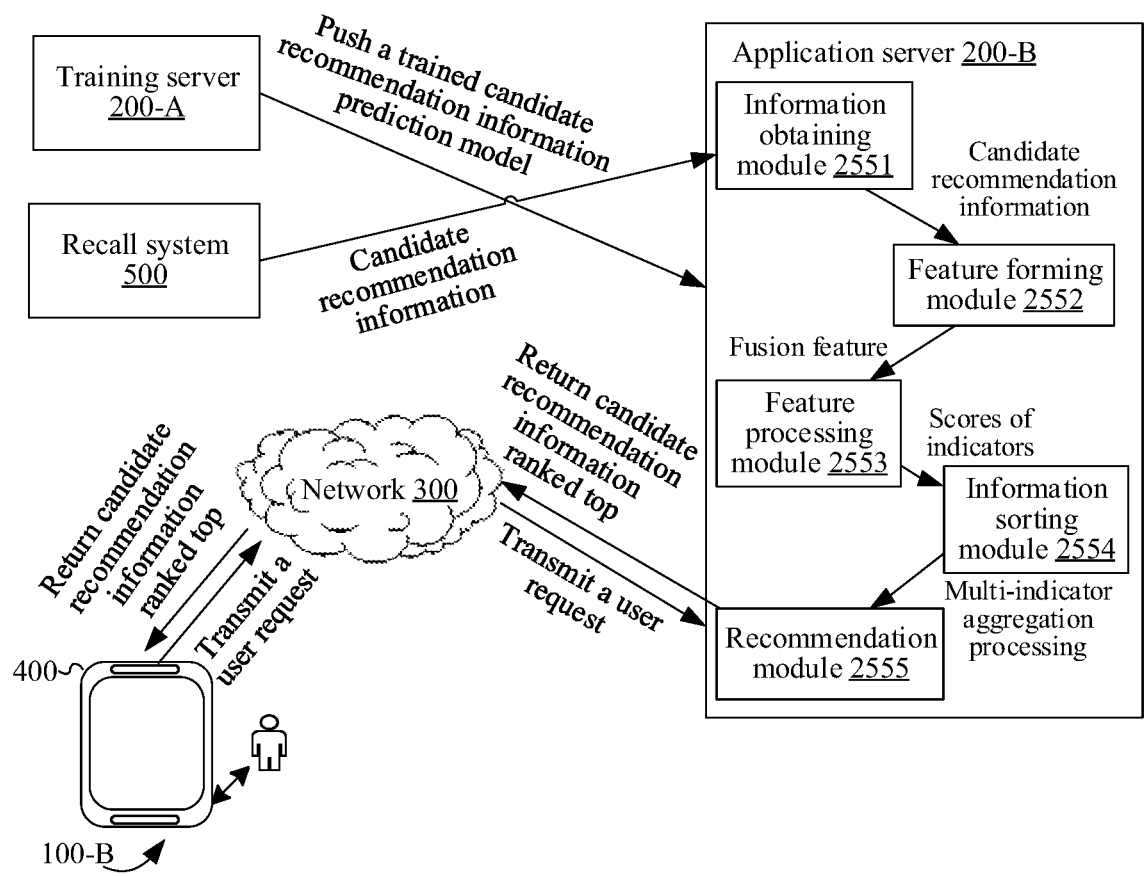
FIG. 1B is a schematic architectural diagram of an AI-based recommendation system according to an embodiment of the present disclosure.

FIG. 1B is an exemplary schematic architectural diagram of an AI-based recommendation system 100-B according to an embodiment of the present disclosure. The terminal 400 is connected to the application server 200-B and the training server 200-A through a network 300. The network 300 may be a wide area network or a local area network, or a combination of thereof. The application server 200-B is responsible for sorting candidate recommendation information offline by using the candidate recommendation information prediction model. The application server 200-B includes an information obtaining module 2551, a feature forming module 2552, a feature processing module 2553, an information sorting module 2554, and a recommendation module 2555. The application server 200-B responds to receiving a user request from the terminal 400, the information obtaining module 2551 obtains, from a recall system 500, candidate recommendation information corresponding to the user request, and the application server 200-B sorts the candidate recommendation information by using the trained candidate recommendation information prediction model obtained from the training server 200-A, and pushes, according to a sorting result, the candidate recommendation information corresponding to the sorting result to the terminal 400 used by the user.

In some embodiments, the application server 200-B may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an AI platform. The terminal 400 may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of the present disclosure.

Figure 2B:
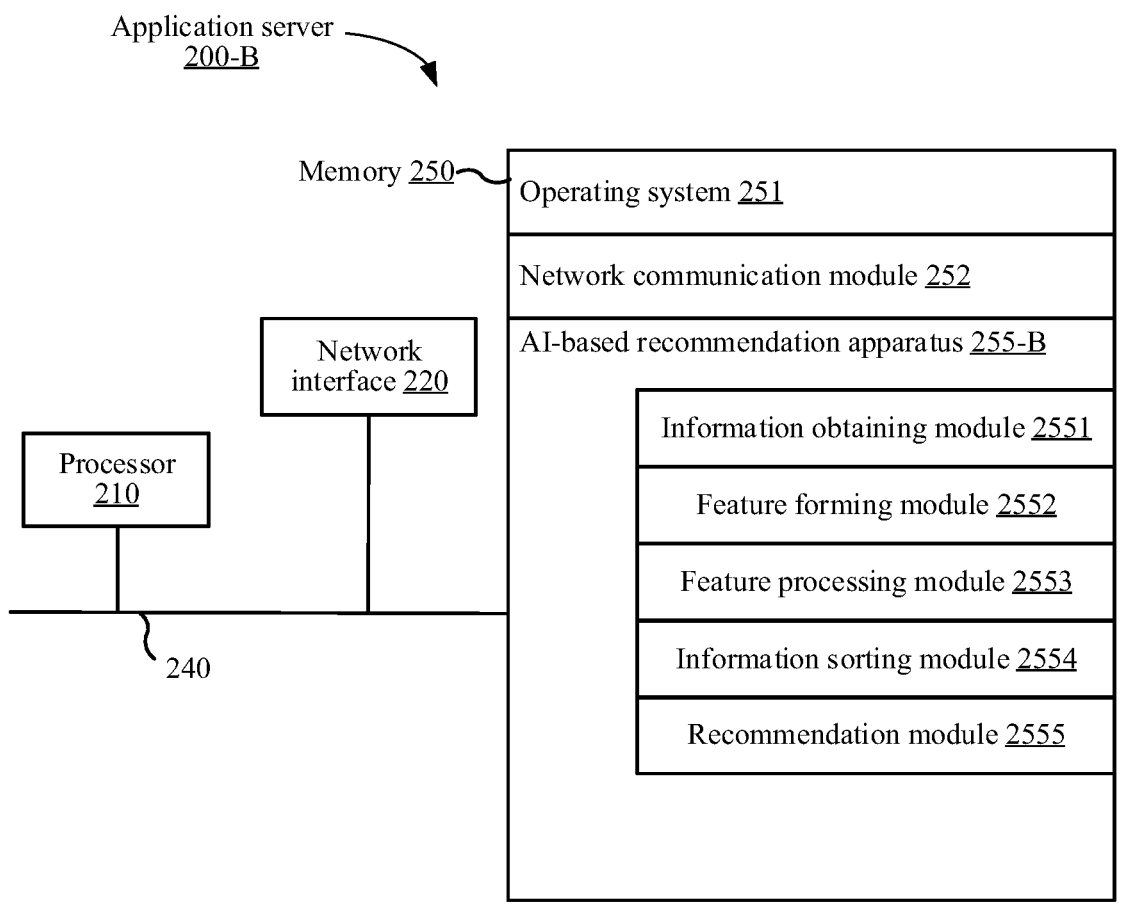
FIG. 2B is a schematic structural diagram of an application server to which an AI-based recommendation method is applied according to an embodiment of the present disclosure.

FIG. 2B is a schematic structural diagram of an application server 200-B to which an AI-based recommendation method is applied according to an embodiment of the present disclosure. A structure of the application server 200-B shown in FIG. 2B is the same as the structure of the training server 200-A, in addition that the application server 200-B includes an AI-based recommendation apparatus 255-B rather than the AI-based recommendation model training apparatus 255-A.

In some embodiments, the AI-based recommendation apparatus 255-B provided in the embodiments of the present disclosure may be implemented by using software. FIG. 2B shows the AI-based recommendation apparatus 255-A stored in a memory 250. The AI-based recommendation apparatus may be software in a form such as a program and a plug-in, and includes the following software modules: the information obtaining module 2551, the feature forming module 2552, the feature processing module 2553, the information sorting module 2554, and the recommendation module 2555. These modules are logical modules, and may be randomly combined or further divided based on a function to be performed. The following describes functions of the modules.

In some other embodiments, the AI-based recommendation apparatus provided in this embodiment of the present disclosure may be implemented by using hardware. For example, the AI-based recommendation apparatus provided in this embodiment of the present disclosure may be a processor in a form of a hardware decoding processor, programmed to perform the AI-based recommendation method provided in the embodiments of the present disclosure. For example, the processor in the form of a hardware decoding processor may use one or more ASICs, a DSP, a PLD, a CPLD, an FPGA, or other electronic components.

Figure 6A:
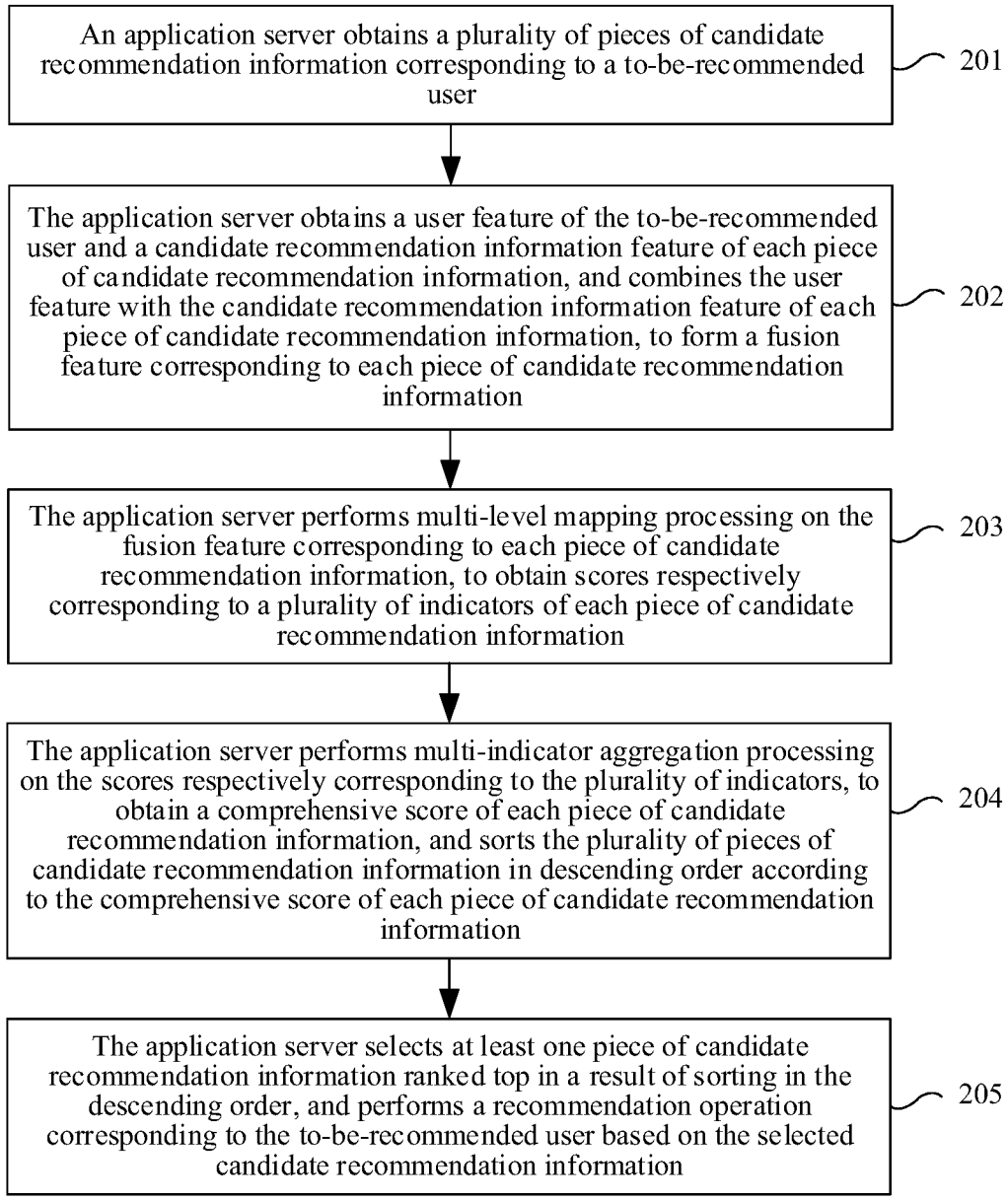
FIGS. 6A-6C are schematic flowcharts of an AI-based recommendation method according to an embodiment of the present disclosure.

FIG. 6A is an exemplary schematic flowchart of an AI-based recommendation method according to an embodiment of the present disclosure. A description is made with reference to operations 201 to 203 shown in FIG. 6A.

Operation 201: An application server obtains a plurality of pieces of candidate recommendation information corresponding to a to-be-recommended user.

In some embodiments, the obtaining a plurality of pieces of candidate recommendation information corresponding to a to-be-recommended user in operation 201 may be implemented by the following technical solution: obtaining at least one of the following types of candidate recommendation information: a plurality of pieces of candidate recommendation information that are similar to content of historical browsing information corresponding to the to-be-recommended user, and whose content similarity is not less than a content similarity threshold;

or a plurality of pieces of candidate recommendation information that are similar to a behavior of historical behavior information corresponding to the to-be-recommended user, and whose behavior similarity is not less than a behavior similarity threshold.

In some embodiments, the plurality of pieces of candidate recommendation information may be obtained by using a recall module in the recommendation system, the plurality of pieces of candidate recommendation information obtained herein are in response to a user request of the to-be-recommended user. The user request herein may be a query request carrying a specific target, or a request to initialize an application. The behavior similarity herein is a similarity between historical behavior information of the user and the candidate recommendation information. The content similarity herein is a similarity between historical browsing information of the user and the candidate recommendation information.

Operation 202: The application server obtains a user feature of the to-be-recommended user and a candidate recommendation information feature of each piece of candidate recommendation information, and combines the user feature with the candidate recommendation information feature of each piece of candidate recommendation information, to form a fusion feature corresponding to each piece of candidate recommendation information.

In some embodiments, the obtaining a user feature of the to-be-recommended user and a candidate recommendation information feature of each piece of candidate recommendation information in operation 202 may be implemented by the following technical solution: obtaining at least one of the following user features corresponding to the to-be-recommended user: a base attribute feature used for representing basic information of the to-be-recommended user; a social relationship feature used for representing a social relationship between users; an interaction behavior feature used for representing an interaction behavior between the users; or a reading psychological feature used for representing a reading preference of the user; and obtaining at least one of the following candidate recommendation information features corresponding to the candidate recommendation information: a category feature used for representing a category of the candidate recommendation information; a label feature used for representing content of the candidate recommendation information; a time feature used for representing a release time of the candidate recommendation information; a release feature used for representing a source of the candidate recommendation information; or a length feature used for representing a length of the candidate recommendation information.

In some embodiments, the basic information may be basic attributes of the user such as a gender, an age, and a long-term residence. The social relationship may be whether married or not or work position, which has a social attribute. The interaction behavior of the user may be behavior such as like, repost, or favorites. The reading preference may be reading interest. The points of interest may be entertainment news, international news or the like. The category of the candidate recommendation information may be a category of an information display carrier, for example, video information, image information, or text information. The content of the candidate recommendation information may be a content topic, such as an educational topic or an entertainment topic.

In some embodiments, the combining the user feature with the candidate recommendation information feature of each piece of candidate recommendation information, to form a fusion feature corresponding to each piece of candidate recommendation information in operation 202 may be implemented by the following technical solution: obtaining at least one of the following environment features corresponding to the to-be-recommended user: a time feature of performing pushing on the to-be-recommended user; a user position feature of the to-be-recommended user; a device feature of the to-be-recommended user; or a network feature of a device used by the to-be-recommended user; and combining the environment feature corresponding to the to-be-recommended user, the user feature, and each candidate recommendation information feature into the fusion feature corresponding to each piece of candidate recommendation information.

In some embodiments, the environment feature also has an impact on indicator prediction. A time of performing pushing on the to-be-recommended user affects whether the to-be-recommended user is free to view the candidate recommendation information. A position of the to-be-recommended user represents a current life scene in which the to-be-recommended user is located, and different life scenes have an impact on the prediction of the indicator. For example, there is a big difference between prediction results of a duration and a click-through rate when the position feature represents that the to-be-recommended user is in a movie theater and prediction results of a duration and a click-through rate when the position feature represents that the to-be-recommended user is in a study room. The network of the device used by the to-be-recommended user affects whether the to-be-recommended user intends to receive candidate recommendation information such as a video that requires a lot of network resources.

Operation 203: The application server performs multi-level mapping processing on the fusion feature corresponding to each piece of candidate recommendation information, to obtain scores respectively corresponding to a plurality of indicators of each piece of candidate recommendation information.

Figure 6B:
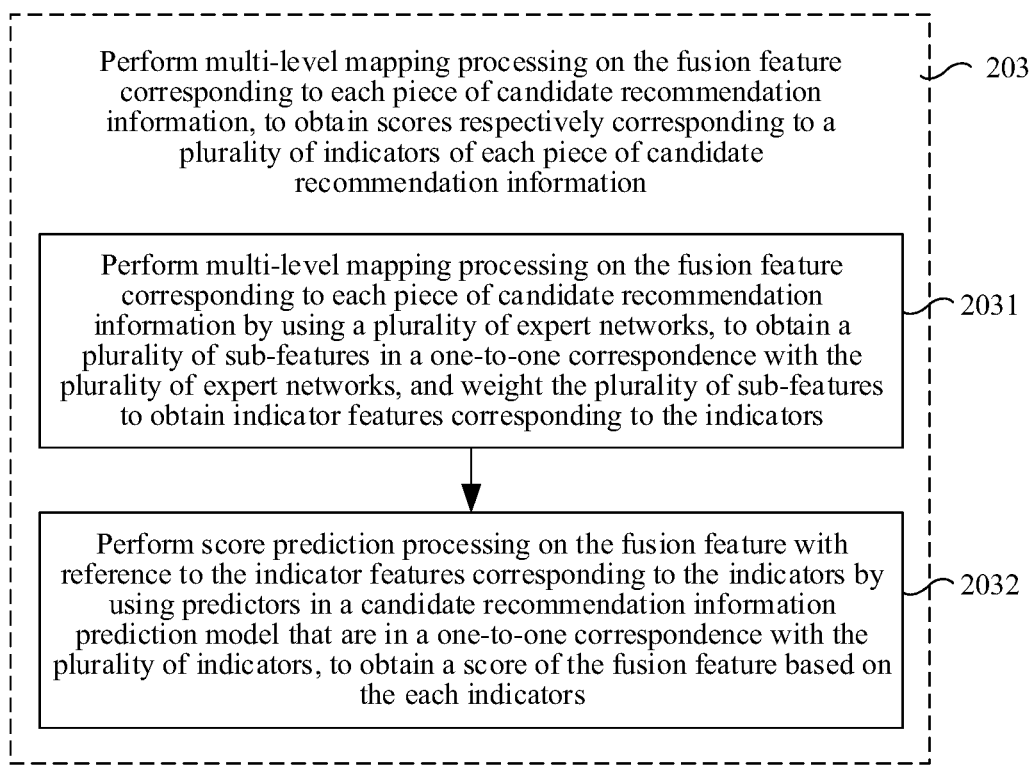

Based on FIG. 6A, FIG. 6B is an exemplary schematic flowchart of an AI-based recommendation method according to an embodiment of the present disclosure. The performing multi-level mapping processing on the fusion feature corresponding to each piece of candidate recommendation information, to obtain scores respectively corresponding to a plurality of indicators of each piece of candidate recommendation information in operation 203 may be implemented in operations 2031 to 2032.

Operation 2031: Perform multi-level mapping processing on the fusion feature corresponding to each piece of candidate recommendation information by using a plurality of expert networks, to obtain a plurality of sub-features in a one-to-one correspondence with the plurality of expert networks, and weight the plurality of sub-features to obtain indicator features corresponding to the indicators.

Figure 6C:
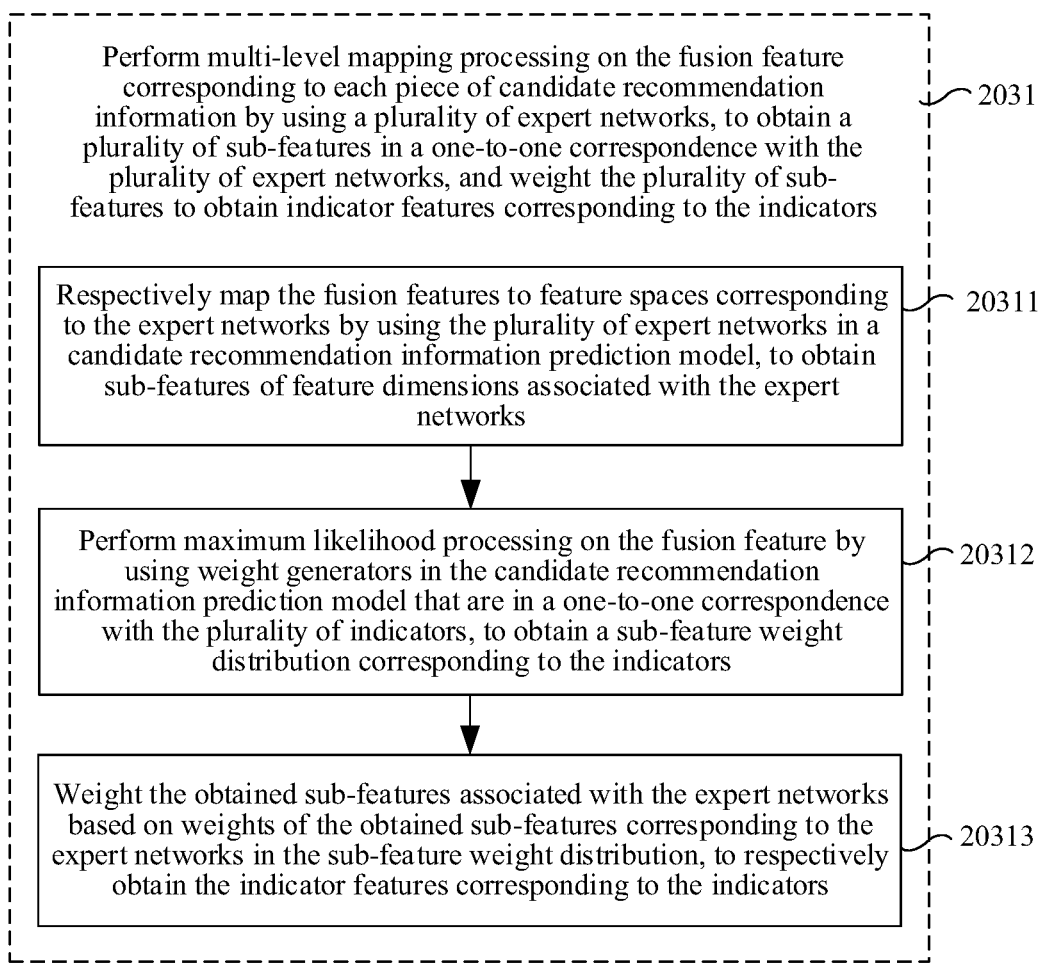

Based on FIG. 6A, FIG. 6C is an exemplary schematic flowchart of an AI-based recommendation method according to an embodiment of the present disclosure. The performing multi-level mapping processing on the fusion feature corresponding to each piece of candidate recommendation information by using a plurality of expert networks, to obtain a plurality of sub-features in a one-to-one correspondence with the plurality of expert networks, and weighting the plurality of sub-features to obtain indicator features corresponding to the indicators in operation 2031 may be implemented in operations 20311 to 20313.

Operation 20311: Respectively map the fusion features to feature spaces corresponding to the expert networks by using the plurality of expert networks in a candidate recommendation information prediction model, to obtain sub-features of feature dimensions associated with the expert networks.

In an example, the plurality of layers of expert networks may be regarded as a plurality of full connection layers, and each expert network is usually a full connection layer with a relatively small quantity of layers.

Operation 20312: Perform maximum likelihood processing on the fusion feature by using weight generators in the candidate recommendation information prediction model that are in a one-to-one correspondence with the plurality of indicators, to obtain a sub-feature weight distribution corresponding to the indicators.

The weight generator is configured to select a signal proportion of each expert network. Each expert network has a skilled prediction direction. Finally, the expert networks act together on the indicators corresponding to the weight generators. "Each" herein refers to each of the plurality of weight generators, and the meaning of "each" in the full text represents each of a plurality of objects.

Operation 20313: Weight the obtained sub-features associated with the expert networks based on weights of the obtained sub-features corresponding to the expert networks in the sub-feature weight distribution, to respectively obtain the indicator features corresponding to the indicators.

Operation 2032: Perform score prediction processing on the fusion feature with reference to the indicator features corresponding to the indicators by using predictors in a candidate recommendation information prediction model that are in a one-to-one correspondence with the plurality of indicators, to obtain a score of the fusion feature based on the each indicators.

In an example, each weight generator is regarded as a weighted sum pooling operation. If the weight generator is adjusted to perform an operation of selecting the largest quantity of sub-features, and x is an input, an expert network in the layers of expert networks that outputs the largest quantity of sub-features is uniquely selected, to transmit a signal upwards.

Operation 204: The application server performs multi-indicator aggregation processing on the scores respectively corresponding to the plurality of indicators, to obtain a comprehensive score of each piece of candidate recommendation information, and sorts the plurality of pieces of candidate recommendation information in descending order according to the comprehensive score of each piece of candidate recommendation information.

In some embodiments, the performing multi-indicator aggregation processing on the scores respectively corresponding to the plurality of indicators, to obtain a comprehensive score of each piece of candidate recommendation information in operation 204 may be implemented by the following technical solution: obtaining an aggregation rule corresponding to the plurality of indicators; and performing calculation processing on the scores respectively corresponding to the plurality of indicators based on an operator included in the aggregation rule, to obtain the comprehensive score that is of each piece of candidate recommendation information and that corresponds to the plurality of indicators.

In some embodiments, the aggregation rule of the plurality of indicators may correspond to different manners of multi-indicator aggregation processing. The multi-indicator herein may be at least two of a duration, a click-through rate, the number of favorites, or the number of reposts. The aggregation rule may be addition, multiplication or another operation rule with parameters. The two indicators of duration and the click-through rate may be multiplied as a manner of multi-indicator aggregation processing.

Operation 205: The application server selects at least one piece of candidate recommendation information ranked top in a result of sorting in the descending order, and performs a recommendation operation corresponding to the to-be-recommended user based on the selected candidate recommendation information.

In some embodiments, N pieces of candidate recommendation information ranked top are selected from the results of sorting in the descending order as candidate recommendation information to be recommended to the to-be-recommended user, where N is a positive integer, and the recommendation operation corresponding to the to-be-recommended user is performed based on the selected candidate recommendation information. The recommendation operation may be to directly push to the to-be-recommended user, or resorting may be performed based on the selected candidate recommendation information. The resorting herein refers to resorting the selected candidate recommendation information according to different manners of multi-indicator aggregation processing, so as to obtain recommendation information liked by the to-be-recommended user from a more comprehensive perspective.

In some embodiments, the recommendation operation corresponding to the to-be-recommended user is performed based on the selected candidate recommendation information, the candidate recommendation information generated herein as a recommendation result is a result obtained based on multi-indicator prediction, not a result generated by a single indicator prediction. Therefore, a recommendation accuracy rate is relatively high, and it is easy to arouse the interest of the to-be-recommended user. The to-be-recommended user performs operations such as reading, clicking/tapping, adding to favorites, and reposting on the candidate recommendation information used as the recommendation result, improving a proportion of interaction behavior and user engagement. The operations of the to-be-recommended user such as reading, clicking/tapping, adding to favorites, and reposting are used as original information of a user profile for archiving and retaining, and are used for training a model at intervals to continuously improve the prediction performance of the model.

Figure 7:
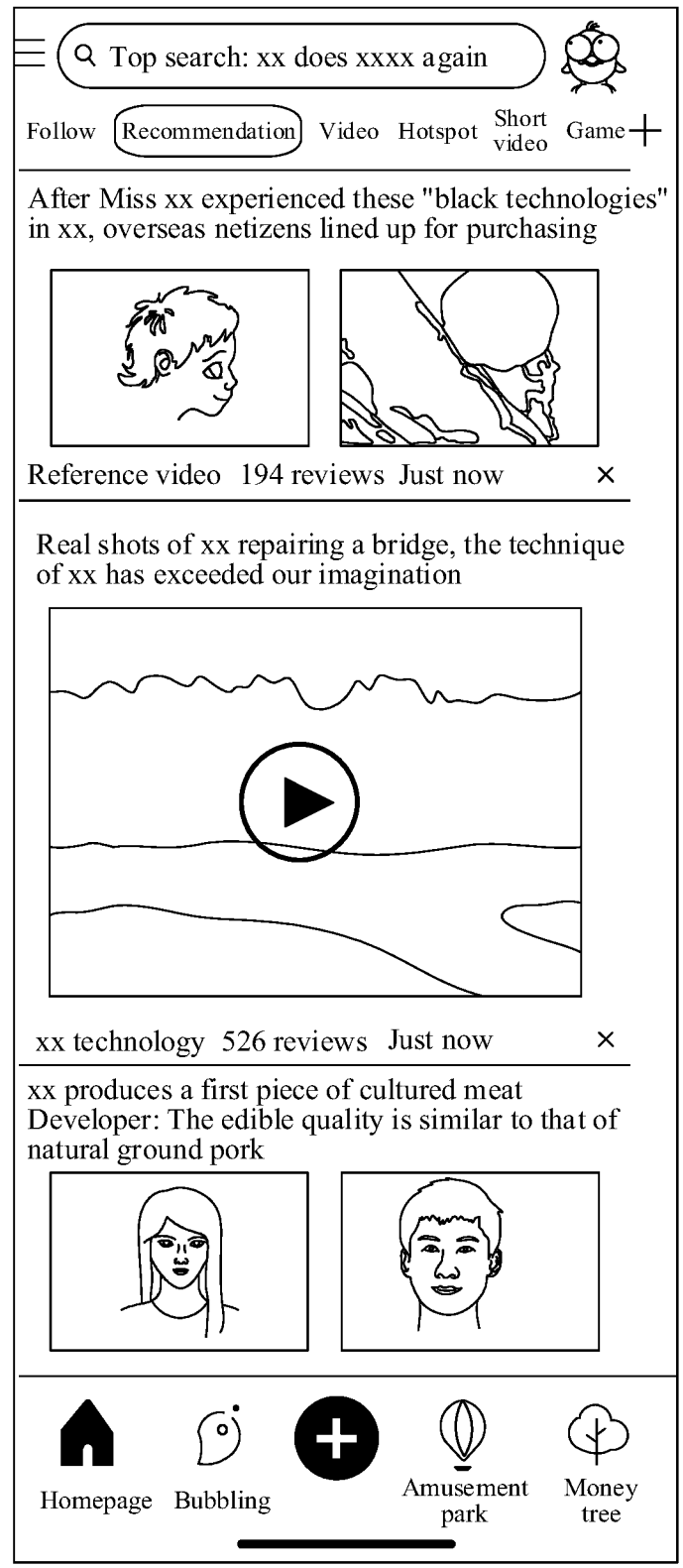
FIG. 7 is a product schematic diagram of an application scenario of an AI-based recommendation method according to an embodiment of the present disclosure.

The following describes an exemplary application of this embodiment of the present disclosure in an actual application scenario. FIG. 7 is a product schematic diagram of an application scenario of an AI-based recommendation method according to an embodiment of the present disclosure. The interface displays three pieces of sorted candidate recommendation information. The pieces of sorted candidate recommendation information are obtained through sorting by using a candidate recommendation information prediction model. An application product may be a news client. Through the effective use of implicit and explicit historical behaviors of the user, the candidate recommendation information prediction model in the recommendation system is trained by using an improved multi-level-based MTL training method. In addition, a configurable design is performed on a sorting target of an online recommendation system, so that accurate and personalized news recommendation is provided to the user.

Figure 8:
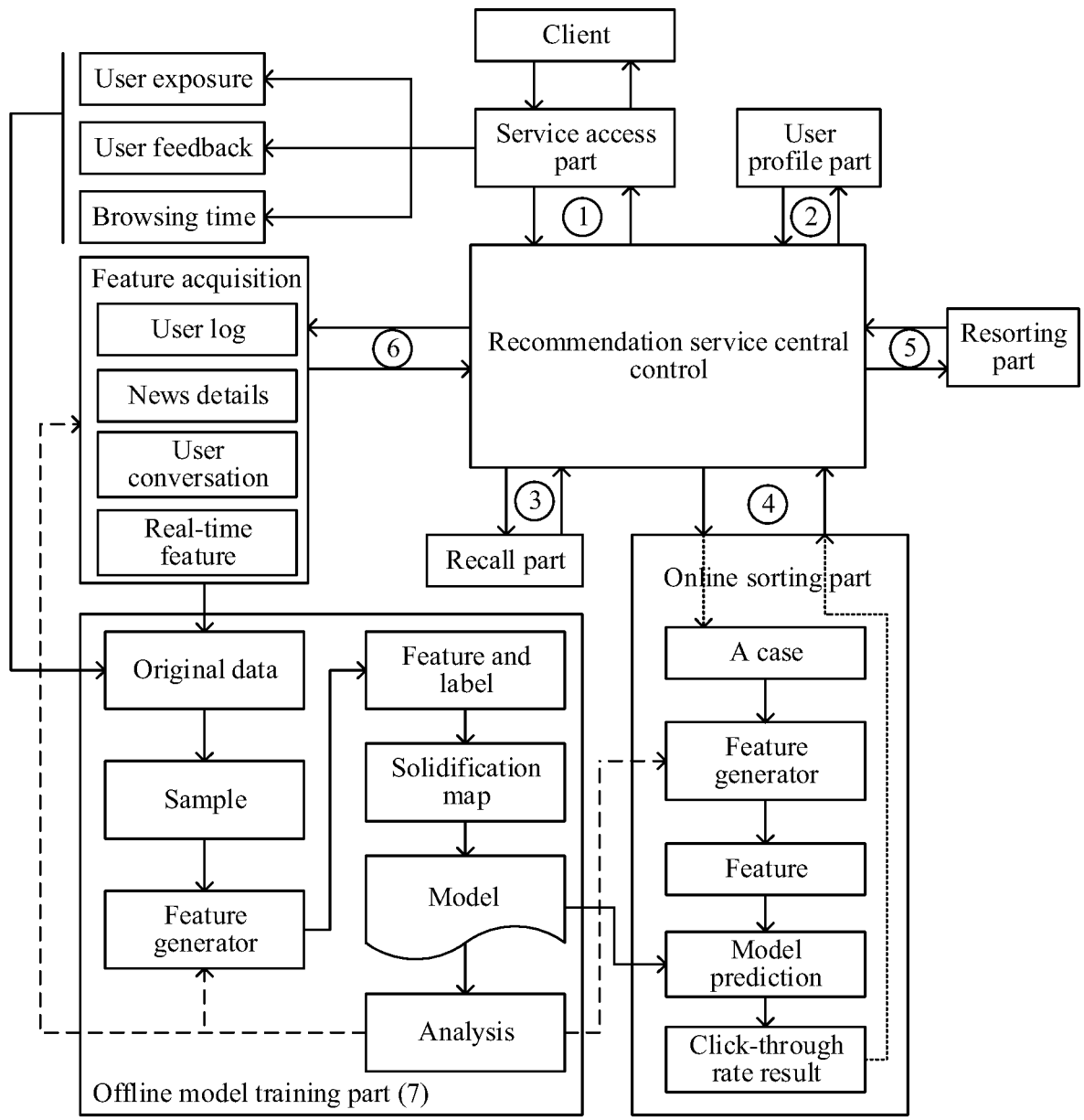
FIG. 8 is an architecture diagram of training and application of a candidate recommendation information prediction model according to an embodiment of the present disclosure.

FIG. 8 is an architecture diagram of training and application of a candidate recommendation information prediction model according to an embodiment of the present disclosure. As shown in FIG. 8, the architecture diagram shown in FIG. 8 includes an offline model training part and an online recommendation system part. After a user request is received, a personalized recommendation information list may be returned to. Units (1) to (6) that directly interact with a recommendation service central control are all online services, and (7) is an offline part, which are respectively explained below.

A service access part (1) receives the user request and obtains related features of a to-be-recommended user. The related features herein may be user exposure, user feedback, and a browsing time. Personalized candidate recommendation information in response to the user request is obtained by using a recall part (3). The obtained candidate recommendation information is sorted by using an online sorting part (4). The candidate recommendation information obtained through sorting is resorted based on different policies by using a resorting part (5). A user profile is obtained by using a user profile part (2). Feature extraction is performed by using a feature acquisition part (6), and the model is trained offline by using an offline model training part (7).

The service access part (1) receives the user request transmitted from a client of the user, and may obtain a user feature of the user based on the user request. The user feature herein may include a preference feature, a behavior feature, and the like. The recommendation service central control obtains, from the recall part and in response to the user request, candidate recommendation information matching the user request, performs, by using a candidate recommendation information prediction model provided in this embodiment of the present disclosure, multi-indicator aggregation sorting based on a click-through rate on the candidate recommendation information obtained by the recall part, and returns a recommendation result to the client through the service access part. For example, recommendation results returned to the client are displayed in FIG. 7, the three pieces of candidate recommendation information displayed herein are all recommendation results that meet the user feature. User exposure data, user feedback data, and browsing time data may be obtained through the service access part.

The recall part (3) triggers as many correct results as possible from a full information set, and returns the results to the online sorting part (4). Recalling is performed in a plurality of manners, including collaborative filtering, theme model, content recall, and hotspot recall. In the recommendation system, the user does not provide a clear search term input, so that the recommendation system needs to recommend content that may be of interest to the user based on various information such as the user profile and a content profile.

In the online sorting part (4), for any recommendation task, a feature of the recommendation task is obtained by using a feature generator, and a click-through rate (a click-through rate result) of each piece of candidate recommendation information is predicted based on the obtained feature and the candidate recommendation information prediction model.

In the feature acquisition part (6), a source of obtaining the feature may be user logs, news details, user conversations, and real-time features.

In the resorting part (5), a difference between sorting and reordering is that a result of sorting is a result obtained in a specific aggregation rule. However, a single aggregation rule has limitations, so that resorting is needed. During the resorting, resorting is performed by using an aggregation rule that is different from the aggregation rule on which the sorting is based. For example, in a sorting stage, a product of a click-through rate and a duration is used as an aggregation manner, while in a resorting stage, a product of a reposting rate and a duration is used as an aggregation manner, to resort the sorted candidate recommendation information.

The following describes the offline model training part (7). The offline model training part may include: a training sample set constructing module, a model constructing module, a training module, and a model online module. The training sample set constructing module includes a training library generation unit, a sampling unit, and a feature generation unit. The training module includes a model training unit. The model online module includes a solidification map unit and a model push unit. The training library generation unit is configured to effectively preprocess original data, which is a prerequisite for improving the accuracy of the training model, fuse an exposure log, a playback log, an information forward index, and a profile feature log of the user according to a user device number, and delete data missing valid single features, to ensure that there is no missing valid single feature information for each sample. The sampling unit is configured to sample a positive sample and a negative sample based on an original training library obtained in the training library generation unit, so that the positive sample and the negative sample maintain in an appropriate proportion (a preset proportion), filter a sample whose playback duration is below a specific threshold, and adopt a fragmentation-threshold positive and negative sample setting solution for different information durations and viewing durations. The feature generation unit (feature generator) is configured to further extract sample information obtained by the sampling unit, and select an appropriate feature with reference to a specific prediction target, to generate sample data (a feature and a label) required for offline model training. The model training unit is configured to perform, by using an improved multi-level-based MTL model, offline model training by using the sample data generated by the feature generation unit. A plurality of layers of expert networks are used in the candidate recommendation information prediction model, and the plurality of layers of expert networks enables underlying feature sharing to be better performed in multi-tasking. Each threshold network with an independent task is used to determine a degree of usage of results of different expert networks. The expert network and the threshold network are both three-dimensional tensors. The expert network may be a simple full connection layer structure. The candidate recommendation information prediction model outputs scores of indicators based on the following formulas:

$$y_k = h^k(f^k(x)) \qquad (5)$$

$$f^k(x) = \sum_{i=1}^{n} g^k(x)_i f_i(x) \qquad (2)$$

$$g^k(x) = \text{softmax}(W_{gk}x) \qquad (1)$$

where $y_k$ is an output corresponding to a $k^{th}$ indicator, $h^k$ is a network of a predictor corresponding to the $k^{th}$ indicator, $f^k$ is an output of a plurality of layers of expert networks corresponding to the $k^{th}$ indicator, $g^k(x)_i$ is a weight of a feature outputted by an $i^{th}$ expert network corresponding to the $k^{th}$ indicator, $f_i(x)$ is the feature outputted by the $i^{th}$ expert network, $W_{gk}$ is a weight parameter of a threshold network corresponding to the $k^{th}$ indicator, and x is an inputted feature. A multi-indicator uncertainty factor is introduced when the candidate recommendation information prediction model is trained, and for a loss function of aggregating multi-tasks in the related art, a manner of grid search is used, and reference is made to formula (10):

$$L_{total} = \sum_i w_i L_i \qquad (10)$$

where $w_i$ is a weight of a loss function corresponding to an $i^{th}$ indicator, $L_i$ is the loss function corresponding to the $i^{th}$ indicator, and $L_{total}$ is the loss function of aggregating multi-tasks. Although the manner of grid search is simple and effective, weight adjustment is time-consuming. Therefore, uncertainty is introduced to measure the weight of the loss function in multi-tasks.

In many cases, the deep learning technology has excellent performance in various fields. This performance depends on strong computing power and a deep network structure, which gives a specific result to a problem. In most cases, deep learning gives an answer to a question, and a model does not give a confidence of a final outputted result. This answer is found by the model from many candidates and has the highest probability. However, in an extreme case, if classification labels are A and B, but an image of class C is inputted in a test phase, a classifier is very likely to bring an unpredictable result. Output of the confidence is realized through Bayesian modeling. In a Bayes model, there are two main types of uncertainty that can be modeled: cognitive uncertainty and accidental uncertainty. The cognitive uncertainty is an inherent uncertainty in the model. Due to inadequacy of training data, data that the model has not encountered before has excessively low confidence. The cognitive uncertainty explains uncertainty of a model parameter. The cognitive uncertainty can be eliminated by increasing training data. For the accidental uncertainty, if there is a relatively large annotation error during data annotation, and this error is not brought by the model, but by the data, a greater bias in a data set indicates that the accidental uncertainty is greater. The accidental uncertainty may be subdivided into two categories: (1) Data dependency or heteroscedasticity uncertainty, which depends on inputted data, and a prediction result is used as an output of the model; (2) Task-dependent or homoscedasticity uncertainty, where task-dependent uncertainty does not depend on input data and is not an output result of the model, which means that there is the same constant for all input data and there are different variables for different tasks. In MTL, task uncertainty indicates relative confidence, reflecting inherent uncertainty in regression and classification problems. Therefore, the homoscedasticity uncertainty is used as noise to optimize a weight in MTL. Gaussian likelihood estimation is maximized by a multi-task loss function by using the homoscedasticity uncertainty. First, a probability model definition for the regression problem is provided, and reference may be made to the following formula (11):

$$p(y \mid f^W(x)) = N(f^W(x), \sigma^2) \qquad (11)$$

where $f^W$ is an output of a neural network, x is input data, and W is a weight. For a classification problem, the output is usually pushed into an activation function, and reference may be made to the following formula:

$$p(y \mid f^W(x), \sigma) = Softmax\left(\frac{1}{\sigma^2} f^W(x)\right) \qquad (12)$$

A multi-task likelihood function is defined below, and reference may be made to the following formula:

$$p(y_1, \ldots, y_k \mid f^W(x)) = p(y_1 \mid f^W(x)) \ldots p(y_k \mid f^W(x)) \qquad (13)$$

where $y_1$ is an output of each subtask in the multi-task, and therefore maximum likelihood estimation can be expressed by using the following formula (14). The maximum likelihood estimate is proportional to a norm in formula (14), where $\sigma$ is a standard deviation of a Gaussian distribution and is noise of the model. The next task is to maximize a likelihood distribution according to W and a.

$$\log p(y \mid f^W(x)) \propto -\frac{1}{2\sigma^2} \|y - f^W(x)\|^2 - \log\sigma \qquad (14)$$

Two tasks are used as an example, that is, there are two outputs. When the two outputs are respectively a continuous output and an independent output, the Gaussian distribution and the maximum likelihood distribution are used for modeling, and a multi-task aggregate loss function of the continuous output and the independent output may be obtained, reference may be made to the following formula:

$$L(W, \sigma_1, \sigma_2) = -\log p(y_1, y_2 = c \mid f^W(x)) = \qquad (15)$$
$$-\log N(y_1; f^W(x), \sigma_1^2) \cdot Softmax(y_2 = c; f^W(x), \sigma_2) =$$
$$\frac{1}{2\sigma_1^2}\|y_1 - f^W(x)\|^2 + \log\sigma_1 - \log p(y_2 = c \mid f^W(x), \sigma_2) =$$
$$\frac{1}{2\sigma_1^2} L(W) + \frac{1}{\sigma_2^2} L_2(W) + \log\sigma_1 + \log\sigma_2$$

where $L_1(W)$ is a first loss function corresponding to a first indicator, $L_2(W)$ is a second loss function corresponding to a second indicator, $$\frac{1}{2\sigma_1^2}$$

is a weight corresponding to the first loss function, $\sigma_1$ is used for representing uncertainty of score prediction on the first indicator, $$\frac{1}{\sigma_2^2}$$

is a weight corresponding to the second loss function, $\sigma_2$ is used for representing uncertainty of score prediction on the second indicator, and W is a structure weight corresponding to each indicator in a candidate recommendation information prediction model.

A task of training is to minimize this maximum likelihood estimation, so that when a (noise) increases, a corresponding weight decreases. In another aspect, as the noise a decreases, the corresponding weight increases.

Meanwhile, for a task of independent output, classification imbalances need to be resolved. Therefore, the loss function for independent output needs to be modified on the basis of a binary classification category cross entropy loss function. The modified loss function is shown in the above formula (7):

$$L_2(W) = -\alpha_t(1 - P_t)^\gamma \log(P_t) \qquad (7)$$

where $\alpha_t$ is a balance factor constant used for balancing positive samples and negative samples, $\gamma$ is an adjustment constant used for adjusting a weight reduction rate of a simple sample, and $P_t$ is a probability value corresponding to a score. The model is configured to adaptively learn difficult samples, and balance a proportion of positive samples to negative samples, and a $\gamma$ factor is added to the original cross entropy loss function, where $\gamma>0$ can reduce loss of a sample that is easy to be classified, and by adaptively learning the difficult samples, the model pays more attention to such samples that are difficult to be distinguished, reducing the influence of simple samples. A balance factor $\alpha_t$ is further added to balance an uneven proportion of the positive samples to the negative samples. In addition to improving the cross entropy loss function, a network activation function is further tuned. A common activation function is improved, so that the activation function has no upper bound and lower bound and is smooth and non-monotonic, and reference may be made to the following formula:

$$f(x) = x * sigmoid(\beta * x) \qquad (4)$$

where $\beta$ is a positive number, which is preferably 1. When $\beta$ is 1, the activation function has upper bound and lower bound and is smooth and non-monotonic, which alleviates a phenomenon of gradient disappearance during training.

The offline model training part further includes a solidification map unit. By fusing model training parameter data with a network structure, and by converting a model parameter into a constant, the parameter is solidified in a model network structure, to ensure the consistency of a network structure of an offline training model and a network structure of an online prediction model. An online recommendation system can simultaneously obtain the network structure and the model training parameter by loading the solidified model file, ensuring consistency. The offline model training part further includes a model push unit. The finally obtained binary model file is pushed to the online recommendation system on a daily or hourly basis at a preset frequency through a timing task. Meanwhile, file content is generated as an information digest algorithm for encoding for subsequent model verification, and an entire offline process is completed.

The following describes the online sorting part (4). The online sorting part (4) further includes a feature generation unit (feature generator), online model prediction part, and the like. A design method of the feature generation unit in an online process is consistent with that of the feature generation unit in the offline process. After receiving a user request, a server obtains a related feature of a user, and obtains candidate recommendation information matching each user request through a recall part. A candidate recommendation information feature of each piece of candidate recommendation information is pulled and is combined with a user feature to obtain a sample format that is consistent with a sample format in the feature generation unit in the offline process. In the online model prediction part, according to an improved multi-task model network structure of the offline training model, the multi-indicator (such as a click-through rate, a duration, a favorites rate, and a like rate) is predicted during online prediction, and an aggregate sorting manner, for example, click-through rate*duration, is designed between a plurality of types of targets as a sorting target value. N items ranked top are selected as recommendation results that are finally returned. The above improvements optimize details of the candidate recommendation information prediction model, strengthen an anti-noise capability of the model, improving the key indicators of the online recommendation system significantly. For test results of the model, reference may be made to Table 1 and Table 2. The foregoing experiments indicate that the associative learning of the click-through rate and the duration can obtain better generalization ability, and core indicators recommended online are obviously positively driven, and a proportion of explicit user interaction behavior is also significantly improved.

TABLE 1

Indicator test results for associative leaning of a model

| Model | AUC | Log (loss function) | Mean-square error |
|---|---|---|---|
| Pctr (single click-through rate) | 0.7045 | 0.3565 | NA |
| Pctr (multi-indicator) | 0.7114 | 0.3302 | NA |
| Pdur (single duration) | 0.6952 | NA | 2623.2 |
| Pdur (multi-indicator) | 0.7030 | NA | 2607.8 |
| Pctr*Pdur (multi-indicator) | 0.7121 | 0.3302 | 2607.8 |

TABLE 2

Indication test results of models

| Model | Per capita duration | Per capita click/tap | Click-through rate |
|---|---|---|---|
| Depth factorization machine | +1.5% | +2.4% | 16.9% |
| Multi-task neural network | +3.1% | +2.7% | 17.7% |
| Multi-task neural network with multi-expert model | +3.5% | +2.9% | 19.3% |
| Improved multi-task neural network | +3.8% | +3.4% | 20.1% |

The embodiments of the present disclosure provide an AI-based recommendation method, which is an improved multi-level-based MTL recommendation method. A sorting model of a personalized recommendation system is deeply optimized and improved by respectively designing a plurality of layers of expert networks, introducing a multi-indicator uncertainty factor, and resolving classification imbalances, so that indicators such as an AUC and a root-mean-square error evaluated offline by the model are improved. In addition, a configurable design (such as a click-through rate, a duration, a like rate, and a sharing rate) for a sorting target of an online recommendation system makes a sorting result more flexible and controllable. This solution has been successfully applied to a recommendation system of a news application, and finally, core indicators recommended online are positively driven, and the proportion of explicit user interaction behavior is also significantly improved.

The following continues to describe an exemplary structure of software modules that implement an AI-based recommendation apparatus 255 provided in the embodiments of the present disclosure. In some embodiments, as shown in FIG. 2B, software modules stored in the AI-based recommendation apparatus 255-B of the memory 250 may include: an information obtaining module 2551, configured to obtain a plurality of pieces of candidate recommendation information corresponding to a to-be-recommended user; a feature forming module 2552, configured to obtain a user feature of the to-be-recommended user and a candidate recommendation information feature of each piece of candidate recommendation information, and combine the user feature with the candidate recommendation information feature of each piece of candidate recommendation information, to form a fusion feature corresponding to each piece of candidate recommendation information; a feature processing module 2553, configured to perform multi-level mapping processing on the fusion feature corresponding to each piece of candidate recommendation information, to obtain scores corresponding to a plurality of indicators of each piece of candidate recommendation information; an information sorting module 2554, configured to perform multi-indicator aggregation processing on the scores respectively corresponding to the plurality of indicators, to obtain a comprehensive score of each piece of candidate recommendation information, and sort the plurality of pieces of candidate recommendation information in descending order according to the comprehensive score of each piece of candidate recommendation information; and a recommendation module 2555, configured to select at least one piece of candidate recommendation information ranked top in a result of sorting in the descending order, and perform a recommendation operation corresponding to the to-be-recommended user based on the selected candidate recommendation information.

In some embodiments, the information obtaining module 2551 is further configured to obtain at least one of the following types of candidate recommendation information: a plurality of pieces of candidate recommendation information that are similar to content of historical browsing information corresponding to the to-be-recommended user, and whose content similarity is not less than a content similarity threshold; or a plurality of pieces of candidate recommendation information that are similar to a behavior of historical behavior information corresponding to the to-be-recommended user, and whose behavior similarity is not less than a behavior similarity threshold.

In some embodiments, the feature forming module 2552 is further configured to obtain at least one of the following user features corresponding to the to-be-recommended user: a base attribute feature used for representing basic information of the to-be-recommended user; a social relationship feature used for representing a social relationship between users; an interaction behavior feature used for representing an interaction behavior between the users; or a reading psychological feature used for representing a reading preference of the user; and obtain at least one of the following candidate recommendation information features corresponding to the candidate recommendation information: a category feature used for representing a category of the candidate recommendation information; a label feature used for representing content of the candidate recommendation information; a time feature used for representing a release time of the candidate recommendation information; a release feature used for representing a source of the candidate recommendation information; or a length feature used for representing a length of the candidate recommendation information.

In some embodiments, the feature forming module 2552 is further configured to obtain at least one of the following environment features corresponding to the to-be-recommended user: a time feature of performing pushing on the to-be-recommended user; a user position feature of the to-be-recommended user; a device feature of the to-be-recommended user; or a network feature of a device used by the to-be-recommended user; and combine the environment feature corresponding to the to-be-recommended user, the user feature, and each candidate recommendation information feature into the fusion feature corresponding to each piece of candidate recommendation information.

In some embodiments, the feature processing module 2553 is further configured to: perform multi-level mapping processing on the fusion feature corresponding to each piece of candidate recommendation information by using a plurality of expert networks, to obtain a plurality of sub-features in a one-to-one correspondence with the plurality of expert networks, and weight the plurality of sub-features to obtain indicator features corresponding to the indicators; and perform score prediction processing on the fusion feature with reference to the indicator features corresponding to the indicators by using predictors in a candidate recommendation information prediction model that are in a one-to-one correspondence with the plurality of indicators, to obtain a score of the fusion feature based on the indicators.

In some embodiments, the feature processing module 2553 is further configured to: respectively map the fusion features to feature spaces corresponding to the expert networks by using the plurality of expert networks in a candidate recommendation information prediction model, to obtain sub-features of feature dimensions associated with the expert networks;

perform maximum likelihood processing on the fusion feature by using weight generators in the candidate recommendation information prediction model that are in a one-to-one correspondence with the plurality of indicators, to obtain a sub-feature weight distribution corresponding to the indicators; and weight the obtained sub-features associated with the expert networks based on weights of the obtained sub-features corresponding to the expert networks in the sub-feature weight distribution, to respectively obtain the indicator features corresponding to the indicators.

In some embodiments, the information sorting module 2554 is further configured to: obtain an aggregation rule corresponding to the plurality of indicators; and perform calculation processing on the scores respectively corresponding to the plurality of indicators based on an operator included in the aggregation rule, to obtain the comprehensive score that is of each piece of candidate recommendation information and that corresponds to the plurality of indicators.

In some embodiments, as shown in FIG. 2A, software modules in the AI-based recommendation model training apparatus 255-A stored in the memory 250 may include: a training sample set constructing module 2556, configured to preprocess a log of a recommendation system, to construct a training sample set; a model constructing module 2557, configured to construct a candidate recommendation information prediction model based on weight generators in a one-to-one correspondence with a plurality of indicators, predictors in a one-to-one correspondence with the plurality of indicators, and a plurality of expert networks; and a training module 2558, configured to perform multi-indicator training on the candidate recommendation information prediction model by using the training sample set, the candidate recommendation information prediction model obtained through training being used for the recommendation system to perform multi-indicator aggregation processing and sorting, to determine to-be-recommended candidate recommendation information according to a sorting result.

In some embodiments, the apparatus 255-A further includes: a model online module 2559, configured to convert a candidate recommendation information prediction model parameter into a constant and solidify the parameter in the candidate recommendation information prediction model, to generate a solidified binary model file; and push the binary model file to the recommendation system, so that a structure of the candidate recommendation information prediction model used in the recommendation system is consistent with that of the candidate recommendation information prediction model obtained after training.

In some embodiments, the training sample set constructing module 2556 is further configured to fuse at least one of an exposure log, a playback log, an information forward index, or a profile feature log in the recommendation system according to a user device identifier, to obtain sample data; sample a positive sample and a negative sample from the obtained sample data, so that the positive sample and the negative sample obtained through sampling maintain in a standard proportion; and perform feature extraction on the positive sample and the negative sample obtained through sampling, to obtain features matching the indicators, and determine a set including the features and real results of the corresponding indicators as a training sample set required for training the candidate recommendation information prediction model.

In some embodiments, the training module 2558 is configured to initialize the candidate recommendation information prediction model, and initialize loss functions corresponding to the plurality of indicators, the loss function including a feature sample and a score corresponding to the feature sample; and perform the following processing in each iterative training process of the candidate recommendation information prediction model: score the feature sample included in the training sample set by using the candidate recommendation information prediction model, to obtain a score corresponding to the feature sample for each indicator; substitute a real result and the score corresponding to the feature sample into the loss function, to determine a corresponding candidate recommendation information prediction model parameter when a minimum value of the loss function is obtained; and update the candidate recommendation information prediction model according to the determined candidate recommendation information prediction model parameter.

In some embodiments, the training module 2558 is configured to respectively map the feature samples to feature spaces corresponding to the expert networks by using the plurality of expert networks in the candidate recommendation information prediction model, to obtain sub-features of feature dimensions associated with the expert networks; weight the obtained sub-features associated with the expert networks based on weights of the obtained sub-features corresponding to the expert networks in the sub-feature weight distribution, to respectively obtain indicator features corresponding to the feature samples; and perform score prediction processing on the feature samples with reference to the indicator features by using the predictors included in the candidate recommendation information prediction model that correspond to the indicators, to obtain scores of the feature samples based on the indicators.

In some embodiments, the training module 2558 is configured to respectively substitute the real results and the scores corresponding to the feature samples for the indicators into the loss functions corresponding to the indicators; perform weighted summation on the loss functions with reference to loss weights corresponding to the loss functions, to obtain an aggregate loss function corresponding to the candidate recommendation information prediction model; and minimize the aggregate loss function, to obtain a corresponding candidate recommendation information prediction model parameter when a minimum value of the aggregate loss function is obtained, the candidate recommendation information prediction model parameter including a structure parameter corresponding to the candidate recommendation information model and a loss weight corresponding to the aggregate loss function.

An embodiment of the present disclosure provides a storage medium storing executable instructions, the executable instructions, when executed by a processor, causing the processor to perform the AI-based recommendation method provided in the embodiments of the present disclosure, for example, the AI-based recommendation method and the AI-based recommendation model training method shown in FIG. 5A to FIG. 5C, and the AI-based recommendation method shown in FIG. 6A to FIG. 6C.

In some embodiments, the storage medium may be a memory such as a ferroelectric RAM (FRAM), a read-only memory (ROM), a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

Based on the above, in the embodiments of the present disclosure, a user feature and a candidate recommendation information feature of candidate recommendation information is combined to form a fusion feature, and multi-level mapping processing is performed on the fusion feature, to obtain scores corresponding to a plurality of indicators, and sorting is performed based on multi-indicator aggregation processing, to positively drive indicators in a recommendation system and improve a proportion of explicit user interaction behavior.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An artificial intelligence (AI)-based recommendation method, performed by at least one processor of an electronic device, the method comprising:

obtaining, by the at least one processor, a plurality of pieces of candidate recommendation information corresponding to a to-be-recommended object;

forming, by the at least one processor, a fusion feature corresponding to each of the plurality of pieces of candidate recommendation information based on obtaining an object feature of the to-be-recommended object and a candidate recommendation information feature of each of the plurality of pieces of candidate recommendation information, and combining the object feature with the candidate recommendation information feature of each of the plurality of pieces of candidate recommendation information;

performing, by the at least one processor, multi-level mapping processing on the fusion feature corresponding to each of the plurality of pieces of candidate recommendation information, to obtain scores corresponding to a plurality of indicators of each of the plurality of pieces of candidate recommendation information, wherein the multi-level mapping processing is performed using one or more layers from a plurality of expert networks, the plurality of expert networks being trained on different learning tasks;

performing, by the at least one processor, multi-indicator aggregation processing on the scores respectively corresponding to the plurality of indicators of each of the plurality of pieces of candidate recommendation information, to obtain a comprehensive score of each of the plurality of pieces of candidate recommendation information, and sorting the plurality of pieces of candidate recommendation information in a descending order according to the comprehensive score of each of the plurality of pieces of candidate recommendation information, wherein multi-indicator aggregation processing comprises using a respective loss function corresponding to each of the plurality of indicators, wherein each of the plurality of indicators has a corresponding uncertainty factor indicating a certainty in score prediction of a respective indicator, wherein the corresponding uncertainty factor is used in the multi-indicator aggregation processing by weighting the respective loss function with the corresponding uncertainty factor, and wherein the respective loss function is based on a log function of a probability value corresponding to a respective score prediction of the respective function multiplied by one minus the probability of the respective score; and selecting, by the at least one processor, at least one piece of candidate recommendation information ranked top in a result of the sorting the plurality of pieces of candidate recommendation information in descending order, and performing a recommendation operation corresponding to the to-be-recommended object based on the selected candidate recommendation information.

2. The method according to claim 1, wherein the obtaining the plurality of pieces of candidate recommendation information corresponding to the to-be-recommended object comprises:

obtaining, by the at least one processor, at least one of the following types of candidate recommendation information:

a plurality of pieces of candidate recommendation information that are similar to content of historical browsing information corresponding to the to-be-recommended object, and whose content similarity is not less than a content similarity threshold; or a plurality of pieces of candidate recommendation information that are similar to a behavior of historical behavior information corresponding to the to-be-recommended object, and whose behavior similarity is not less than a behavior similarity threshold.

3. The method according to claim 1, wherein the obtaining the object feature and the candidate recommendation information feature comprises:

obtaining, by the at least one processor, at least one of the following object features corresponding to the to-be-recommended object:

a base attribute feature used for representing basic information of the to-be-recommended object; a social relationship feature used for representing a social relationship between objects; an interaction behavior feature used for representing an interaction behavior between the objects; or a reading psychological feature used for representing a reading preference of the object; and obtaining, by the at least one processor, at least one of the following candidate recommendation information features corresponding to the plurality of pieces of the candidate recommendation information:

a category feature used for representing a category of the candidate recommendation information; a label feature used for representing content of the candidate recommendation information; a time feature used for representing a release time of the candidate recommendation information; a release feature used for representing a source of the candidate recommendation information; or a length feature used for representing a length of the candidate recommendation information.

4. The method according to claim 1, wherein the forming of the fusion feature corresponding to each of the plurality of pieces of candidate recommendation information comprises:

obtaining, by the at least one processor, at least one of the following environment features corresponding to the to-be-recommended object:

a time feature of performing pushing on the to-be-recommended object; an object position feature of the to-be-recommended object; a device feature of the to-be-recommended object; or a network feature of a device used by the to-be-recommended object; and combining, by the at least one processor, the environment feature corresponding to the to-be-recommended object, the object feature, and the candidate recommendation information feature of each of the plurality of pieces of candidate recommendation information into the fusion feature corresponding to each of the plurality of pieces of candidate recommendation information.

5. The method according to claim 1, wherein the obtaining scores corresponding to the plurality of indicators of each of the plurality of pieces of candidate recommendation information comprises:

performing, by the at least one processor, multi-level mapping processing on the fusion feature corresponding to each of the plurality of pieces of candidate recommendation information by using the plurality of expert networks, to obtain a plurality of sub-features in a one-to-one correspondence with the plurality of expert networks, and weighting the plurality of sub-features to obtain indicator features corresponding to the plurality of indicators; and performing, by the at least one processor, score prediction processing on the fusion feature with reference to the indicator features corresponding to the plurality of indicators by using predictors in a candidate recommendation information prediction model that are in a one-to-one correspondence with the plurality of indicators, to obtain a score of the fusion feature based on the indicators.

6. The method according to claim 5, wherein the performing multi-level mapping processing comprises:

respectively mapping, by the at least one processor, the fusion features to feature spaces corresponding to the expert networks by using the plurality of expert networks in the candidate recommendation information prediction model, to obtain sub-features of feature dimensions associated with the expert networks; and the weighting the plurality of sub-features to obtain indicator features corresponding to the plurality of indicators comprises:

performing, by the at least one processor, maximum likelihood processing on the fusion feature by using weight generators in the candidate recommendation information prediction model that are in a one-to-one correspondence with the plurality of indicators, to obtain a sub-feature weight distribution corresponding to the plurality of indicators; and weighting, by the at least one processor, the obtained sub-features associated with the expert networks based on weights of the obtained sub-features corresponding to the expert networks in the sub-feature weight distribution, to respectively obtain the indicator features corresponding to the plurality of indicators.

7. The method according to claim 1, wherein the performing multi-indicator aggregation processing on the scores respectively corresponding to the plurality of indicators, to obtain the comprehensive score of each of the plurality of pieces of candidate recommendation information comprises:

obtaining, by the at least one processor, an aggregation rule corresponding to the plurality of indicators; and performing, by the at least one processor, calculation processing on the scores respectively corresponding to the plurality of indicators based on an operator comprised in the aggregation rule, to obtain the comprehensive score that is of each of the plurality of pieces of candidate recommendation information and that corresponds to the plurality of indicators.

8. An artificial intelligence (AI)-based recommendation model training method, performed by at least one processor of an electronic device, the method comprising:

preprocessing, by the at least one processor, a log of a recommendation system, to construct a training sample set;

constructing, by the at least one processor, a candidate recommendation information prediction model based on a plurality of expert networks, weight generators in a one-to-one correspondence with a plurality of indicators, and predictors in a one-to-one correspondence with the plurality of indicators, wherein the plurality of expert models is trained on different learning tasks; and performing, by the at least one processor, multi-indicator training on the candidate recommendation information prediction model by using the training sample set, the candidate recommendation information prediction model obtained through training being used for the recommendation system to perform multi-indicator aggregation processing and sorting, to determine to-be-recommended candidate recommendation information according to a sorting result, wherein multi-indicator aggregation processing comprises using a respective loss function corresponding to each of the plurality of indicators, wherein each of the plurality of indicators has a corresponding uncertainty factor indicating a certainty in score prediction of a respective indicator, wherein the corresponding uncertainty factor is used in the multi-indicator aggregation processing by weighting the respective loss function with the corresponding uncertainty factor, and wherein the respective loss function is based on a log function of a probability value corresponding to a respective score prediction of the respective function multiplied by one minus the probability of the respective score.

9. The method according to claim 8, wherein the preprocessing the log of the recommendation system comprises:

fusing, by the at least one processor, at least one of an exposure log, a playback log, an information forward index, or a profile feature log in the recommendation system according to an object device identifier, to obtain sample data;

sampling, by the at least one processor, a positive sample and a negative sample from the obtained sample data, so that the positive sample and the negative sample obtained through sampling maintain in a standard proportion; and performing, by the at least one processor, feature extraction on the positive sample and the negative sample obtained through sampling, to obtain features matching the plurality of indicators, and determining a set comprising the features and real results of corresponding indicators from the plurality of indicators as a training sample set required for training the candidate recommendation information prediction model.

10. The method according to claim 8, wherein the performing multi-indicator training comprises:

initializing, by the at least one processor, the candidate recommendation information prediction model, and initializing loss functions corresponding to the plurality of indicators, the loss function comprising a feature sample and a score corresponding to the feature sample; and performing, by the at least one processor, the following processing in each iterative training process of the candidate recommendation information prediction model:

scoring, by the at least one processor, the feature sample comprised in the training sample set by using the candidate recommendation information prediction model, to obtain a score corresponding to the feature sample for each indicator of the plurality of indicators;

substituting, by the at least one processor, a real result and the score corresponding to the feature sample into the loss function, to determine a corresponding candidate recommendation information prediction model parameter based on a minimum value of the loss function being obtained; and updating, by the at least one processor, the candidate recommendation information prediction model according to the determined candidate recommendation information prediction model parameter.

11. The method according to claim 10, wherein the scoring the feature sample comprises:

respectively mapping, by the at least one processor, the feature samples to feature spaces corresponding to the expert networks by using the plurality of expert networks in the candidate recommendation information prediction model, to obtain sub-features of feature dimensions associated with the expert networks;

performing, by the at least one processor, maximum likelihood processing on a fusion feature by using the weight generators comprised in the candidate recommendation information prediction model that correspond to the indicators, to obtain a sub-feature weight distribution corresponding to the plurality of indicators;

weighting, by the at least one processor, the obtained sub-features of feature dimensions associated with the expert networks based on weights of the obtained sub-features corresponding to the expert networks in the sub-feature weight distribution, to respectively obtain indicator features corresponding to the feature samples; and performing, by the at least one processor, score prediction processing on the feature samples with reference to the indicator features by using the predictors comprised in the candidate recommendation information prediction model that correspond to the indicators, to obtain scores of the feature samples based on the indicators.

12. The method according to claim 10, wherein the substituting comprises:

respectively substituting, by the at least one processor, the real results and the scores corresponding to the feature samples for the indicators into the loss functions corresponding to the plurality of indicators;

performing, by the at least one processor, weighted summation on the loss functions with reference to loss weights corresponding to the loss functions, to obtain an aggregate loss function corresponding to the candidate recommendation information prediction model; and minimizing, by the at least one processor, the aggregate loss function, to obtain the corresponding candidate recommendation information prediction model parameter based on a minimum value of the aggregate loss function being obtained, the candidate recommendation information prediction model parameter comprising a structure parameter corresponding to a candidate recommendation information model and a loss weight corresponding to the aggregate loss function.

13. An artificial intelligence (AI)-based recommendation apparatus, comprising:
 at least one memory configured to store program code; and
 at least one processor configured to read the program code and operate as instructed by the program code, the program code comprising:
  first obtaining code configured to cause the at least one processor to obtain a plurality of pieces of candidate recommendation information corresponding to a to-be-recommended object;
  first forming code configured to cause the at least one processor to obtain an object feature of the to-be-recommended object and a candidate recommendation information feature of each piece of candidate recommendation information, and combine the object feature with the candidate recommendation information feature of each piece of candidate recommendation information, to form a fusion feature corresponding to each piece of candidate recommendation information;
  first processing code configured to cause the at least one processor to perform multi-level mapping processing on the fusion feature corresponding to each piece of candidate recommendation information, to obtain scores corresponding to a plurality of indicators of each piece of candidate recommendation information, wherein the multi-level mapping processing is performed using one or more layers from a plurality of expert networks, the plurality of expert networks being trained on different learning tasks;
  first sorting code configured to cause the at least one processor to perform multi-indicator aggregation processing on the scores respectively corresponding to the plurality of indicators of each piece of candidate recommendation information, to obtain a comprehensive score of each piece of candidate recommendation information, and sort the plurality of pieces of candidate recommendation information in descending order according to the comprehensive score of each piece of candidate recommendation information, wherein multi-indicator aggregation processing comprises using a respective loss function corresponding to each of the plurality of indicators, wherein each of the plurality of indicators has a corresponding uncertainty factor indicating a certainty in score prediction of a respective indicator, wherein the corresponding uncertainty factor is used in the multi-indicator aggregation processing by weighting the respective loss function with the corresponding uncertainty factor, and wherein the respective loss function is based on a log function of a probability value corresponding to a respective score prediction of the respective function multiplied by one minus the probability of the respective score; and
  first recommendation code configured to cause the at least one processor to select at least one piece of candidate recommendation information ranked top in a result of sorting in the descending order, and perform a recommendation operation corresponding to the to-be-recommended object based on the selected candidate recommendation information.

14. The apparatus of claim 13, the first obtaining code further comprising:
 second obtaining code configured to cause the at least one processor to obtain at least one of the following types of candidate recommendation information:
  a plurality of pieces of candidate recommendation information that are similar to content of historical browsing information corresponding to the to-be-recommended object, and whose content similarity is not less than a content similarity threshold; or
  a plurality of pieces of candidate recommendation information that are similar to a behavior of historical behavior information corresponding to the to-be-recommended object, and whose behavior similarity is not less than a behavior similarity threshold.

15. The apparatus of claim 13, wherein the first forming code further comprises:
 third obtaining code configured to cause the at least one processor to obtain at least one of the following object features corresponding to the to-be-recommended object:
  a base attribute feature used for representing basic information of the to-be-recommended object; a social relationship feature used for representing a social relationship between objects; an interaction behavior feature used for representing an interaction behavior between the objects; or a reading psychological feature used for representing a reading preference of the object; and
 fourth obtaining code configured to cause the at least one processor to obtain at least one of the following candidate recommendation information features corresponding to the plurality of pieces of the candidate recommendation information:
  a category feature used for representing a category of the candidate recommendation information; a label feature used for representing content of the candidate recommendation information; a time feature used for representing a release time of the candidate recommendation information; a release feature used for representing a source of the candidate recommendation information; or a length feature used for representing a length of the candidate recommendation information.

16. The apparatus of claim 13, wherein the first forming code further comprises:
 fifth obtaining code configured to cause the at least one processor to obtain at least one of the following environment features corresponding to the to-be-recommended object:
  a time feature of performing pushing on the to-be-recommended object; an object position feature of the to-be-recommended object; a device feature of the to-be-recommended object; or a network feature of a device used by the to-be-recommended object; and
 first combining code configured to cause the at least one processor to combine the environment feature corresponding to the to-be-recommended object, the object feature, and the candidate recommendation information feature of each of the plurality of pieces of candidate recommendation information into the fusion feature corresponding to each of the plurality of pieces of candidate recommendation information.

17. The apparatus of claim 13, wherein the first processing code further comprises:
first performing code configured to cause the at least one processor to perform multi-level mapping processing on the fusion feature corresponding to each of the plurality of pieces of candidate recommendation information by using the plurality of expert networks, to obtain a plurality of sub-features in a one-to-one correspondence with the plurality of expert networks, and weighting the plurality of sub-features to obtain indicator features corresponding to the plurality of indicators; and
second performing code configured to cause the at least one processor to perform score prediction processing on the fusion feature with reference to the indicator features corresponding to the plurality of indicators by using predictors in a candidate recommendation information prediction model that are in a one-to-one correspondence with the plurality of indicators, to obtain a score of the fusion feature based on the indicators.

18. The apparatus of claim 17, wherein the first performing code further comprises:
mapping code configured to cause the at least one processor to respectively map the fusion features to feature spaces corresponding to the expert networks by using the plurality of expert networks in the candidate recommendation information prediction model, to obtain sub-features of feature dimensions associated with the expert networks; and
wherein the weighting the plurality of sub-features to obtain indicator features corresponding to the plurality of indicators comprises:

third performing code configured to cause the at least one processor to perform maximum likelihood processing on the fusion feature by using weight generators in the candidate recommendation information prediction model that are in a one-to-one correspondence with the plurality of indicators, to obtain a sub-feature weight distribution corresponding to the plurality of indicators; and
first weighting code configured to cause the at least one processor to weigh the obtained sub-features associated with the expert networks based on weights of the obtained sub-features corresponding to the expert networks in the sub-feature weight distribution, to respectively obtain the indicator features corresponding to the plurality of indicators.

19. The apparatus of claim 13, wherein the first sorting code is further comprises:
sixth obtaining code configured to cause the at least one processor to obtain an aggregation rule corresponding to the plurality of indicators; and
fourth performing code configured to cause the at least one processor to perform calculation processing on the scores respectively corresponding to the plurality of indicators based on an operator comprised in the aggregation rule, to obtain the comprehensive score that is of each of the plurality of pieces of candidate recommendation information and that corresponds to the plurality of indicators.

* * * * *